Jan. 16, 1934.   W. D. FOSTER   1,943,304
FILM HANDLING APPARATUS
Filed Jan. 29, 1929   6 Sheets-Sheet 2

Inventor
WARREN DUNHAM FOSTER
By Haldo J. Morse Attorney

Jan. 16, 1934. W. D. FOSTER 1,943,304
FILM HANDLING APPARATUS
Filed Jan. 29, 1929 6 Sheets-Sheet 3

INVENTOR.
WARREN DUNHAM FOSTER
BY Waldo G. Morse
ATTORNEY

Jan. 16, 1934.     W. D. FOSTER     1,943,304
FILM HANDLING APPARATUS
Filed Jan. 29, 1929      6 Sheets-Sheet 4
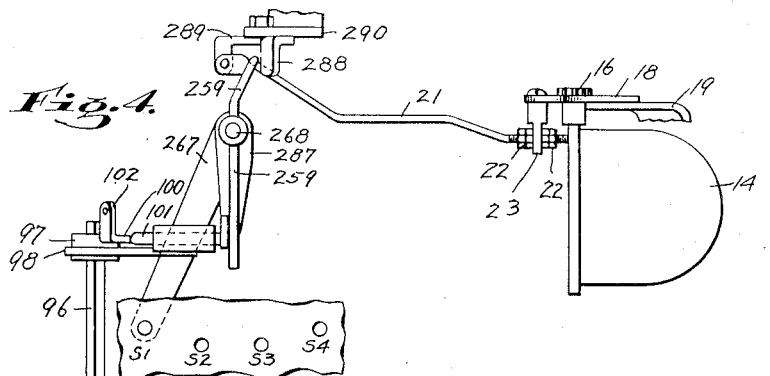
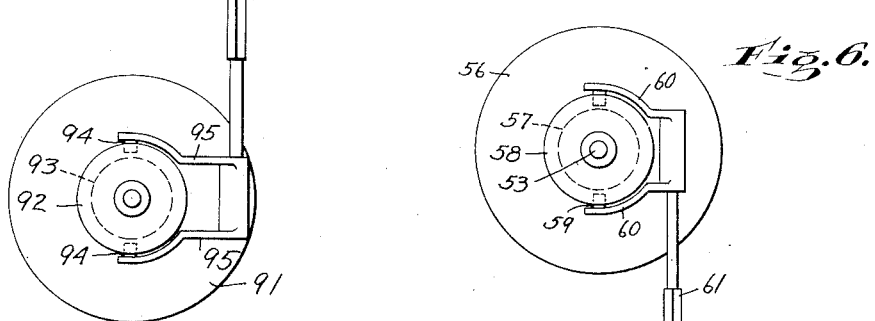
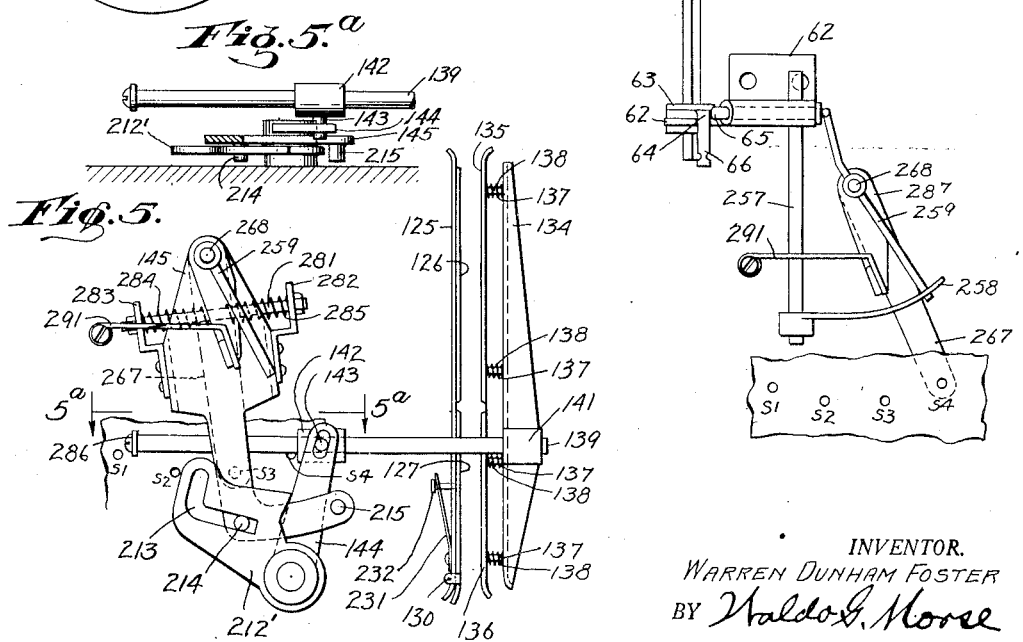
INVENTOR.
WARREN DUNHAM FOSTER
BY Waldo G. Morse
ATTORNEY

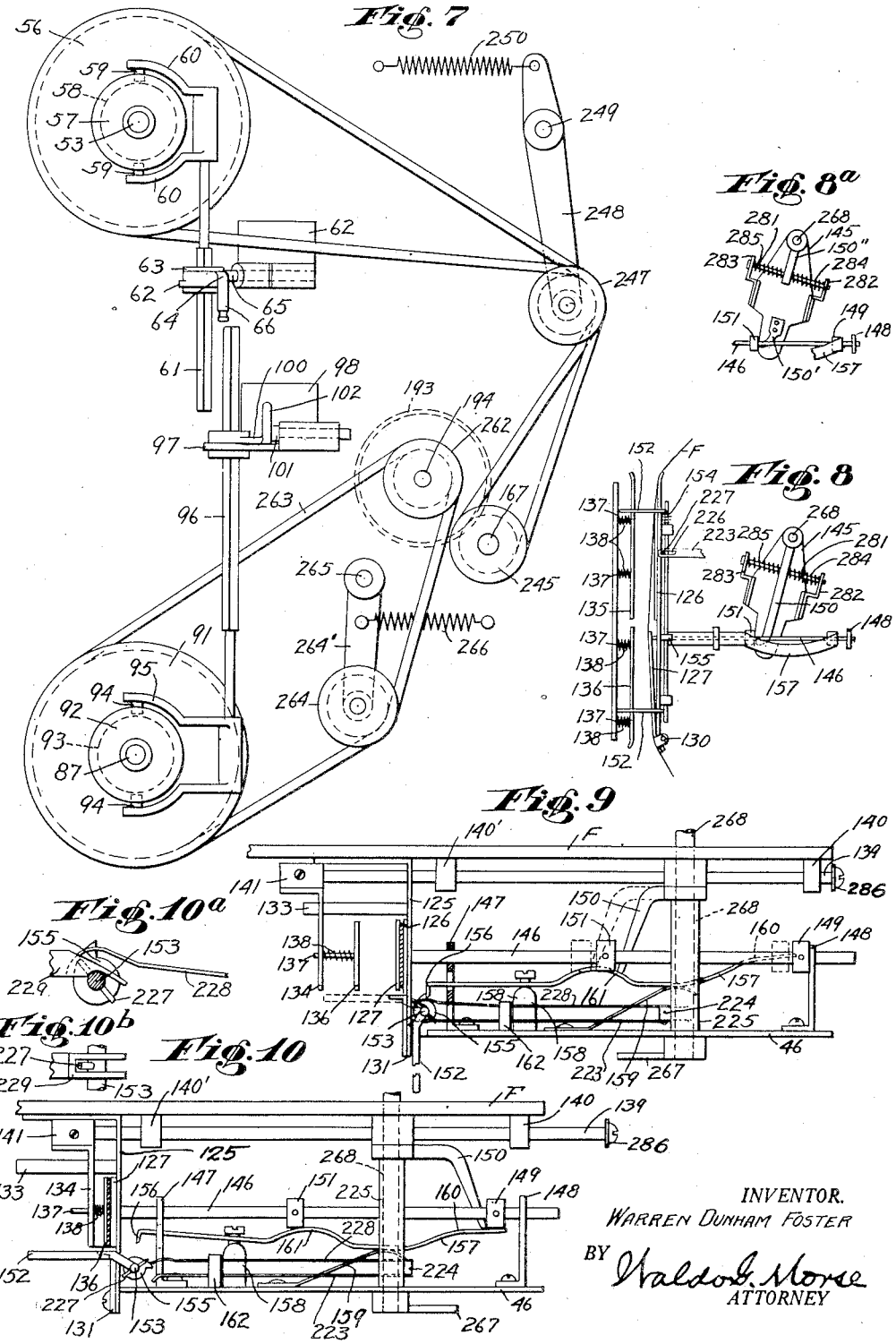

Jan. 16, 1934.  W. D. FOSTER  1,943,304
FILM HANDLING APPARATUS
Filed Jan. 29, 1929  6 Sheets-Sheet 6
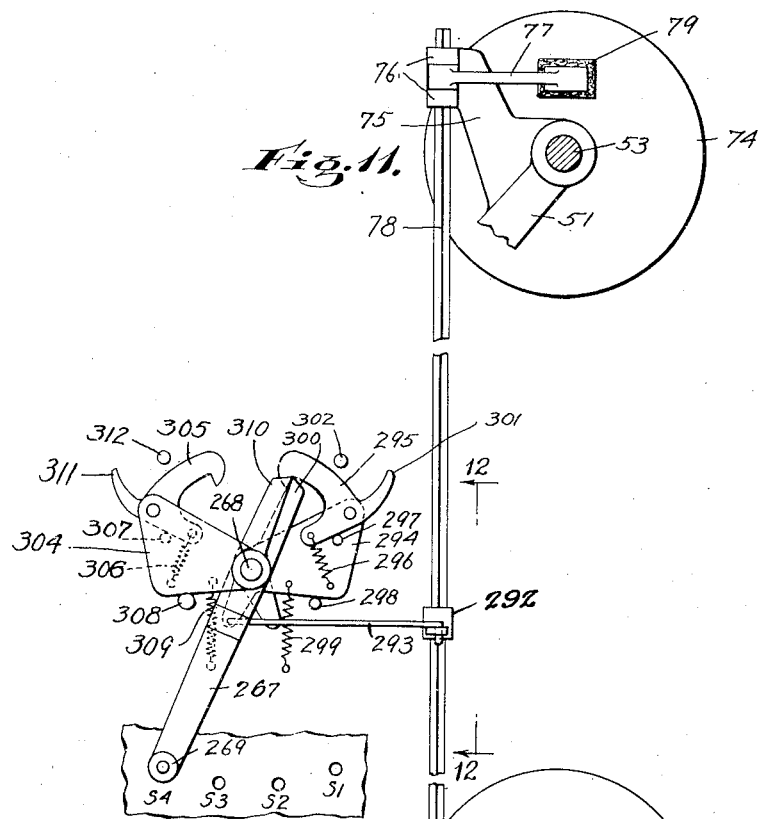
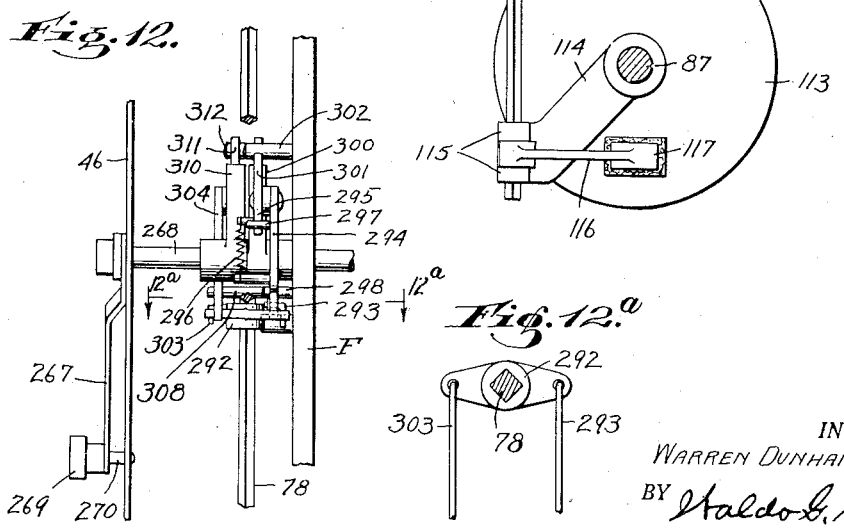
INVENTOR.
WARREN DUNHAM FOSTER
BY Haldo G. Morse
ATTORNEY Patented Jan. 16, 1934

1,943,304

UNITED STATES PATENT OFFICE 1,943,304

FILM HANDLING APPARATUS

Warren Dunham Foster, Washington Township, Bergen County, N. J., assignor to Kinatome Patents Corporation, New York, N. Y., a corporation of New York Application January 29, 1929. Serial No. 335,832

60 Claims. (Cl. 88—17)

The present invention relates broadly to the art of photography, and more particularly to improvements in apparatus adapted for the handling of films, whether for the projection of pictures in motion, or for the repetitious projection of still pictures, or for the taking of pictures in motion or of still pictures, or for the reproduction or recordation upon films of images representing sound, as in film playing phonographs, or for the reproduction or recordation of such images in conjunction with visual images. It will readily be understood, however, that the present invention is applicable to many other uses.

The present invention provides simple effective and improved means for the automatic threading of the film by handling apparatus and without manipulation of the film by the operator. In apparatus constructed according to the present invention, the user merely places the film in or adjacent the gate, moves one control member, and the mechanism without damage to the film correctly positions it in all planes and also in co-operative relation to the driving means, and automatically creates and maintains the conditions of tension which are necessary for proper operation.

In order to facilitate the automatic positioning of the film in engagement with the feeding mechanism, it has been proposed to press the film against such mechanism, retain it there under pressure, initiate the operation of the take-up spindle whereby the film is pulled over the teeth of the moving mechanism so that such teeth may find their appropriate places in the perforations of the film, and then to initiate the operation of the feeding mechanism. Under certain circumstances, however, another method of placing the film in operative relation with the feeding mechanism is desirable. In apparatus constructed according to the present invention, the film may first be brought within range of the teeth of the moving means but not pressed against such teeth nor subjected to tension either in the form of gate tension or in the form of pull upon an end of the film by the take-up mechanism. There may then ensue a short period which may be termed one of groping; the teeth of the feeding mechanism operating against the surface of the film which is free to move within the direction of thrust of such teeth within narrowly defined limits and to move freely in a direction substantially parallel to the direction of travel of the film through the apparatus, lateral movement of the film preferably being closely restricted. After there has been opportunity for such teeth to have made engagement with the appropriate perforations, the gate is completely closed. It will be readily understood that such method of mechanically placing the film in operative relation with the teeth of the moving means under many conditions will minimize the danger of injury to the film and wear thereupon. When the gate is so closed, the film, if of sixteen millimeters in width with no perforations intermediate the "frame" lines will have been completely and correctly "framed"; that is, one complete picture will be positioned in line with the aperture and projected motionless upon the screen. The heat protective means is automatically retained in cooperative relation with the film whereby all danger of injury to the film from heat is avoided, although permitting the image to appear upon the screen. It will be readily understood that in certain forms of so-called talking motion picture apparatus, this provision of complete and proper framing of the picture before full operation is of particular usefulness.

After the film has been so positioned, the feeding mechanism is again actuated and the take-up mechanism actuated. If desired for any purpose, the apparatus may be so constructed that the take-up mechanism is so actuated before the feeding mechanism or the feeding mechanism before the take-up mechanism, as the particular conditions may demand.

The entire operation as described above is automatically accomplished and is governed by unitary control means.

Another object of the present invention is to provide an improved gate structure and a control mechanism therefor. In apparatus constructed according to the present invention, such a gate is normally completely open for the reception of a film, the lateral positioning and locking mechanism actuated, the gate then closed to an intermediate position whereby the film is allowed freedom of movement within certain limits, the gate automatically held in such position, and then completely closed.

Another object of the present invention is the provision of means necessarily effective prior to a re-winding operation whereby the film is correctly positioned laterally in the gate and locked therein during such re-winding operation. In an apparatus constructed according to the present invention if the user proceeds directly from the so-called film threading position to the re-winding position, such positioning and locking means are rendered operative. Moreover the positioning and locking means are automatically retracted from the locking position at the close of the rewinding or normal feeding operation and re-set for future use. All of the above operations are automatically controlled preferably by one member.

A further object of the present invention is the automatic resetting of the film positioning and film locking means.

A further object is the provision of safeguards preventing the insertion of a film in the gate while the film moving mechanism is in operation.

The present invention provides improved means for controlling the film moving mechanism and the heat protective means. In the film handling art, it has been proposed to remove the heat shield from protective position substantially simultaneously with the actuation of the film moving means. In apparatus constructed according to the present invention, the heat reducing means is retained in protective relation with the film until after the film moving mechanism has been made completely operative. Also improved positive and mechanical automatic control for such heat protective mechanism is provided.

Another object of the present invention is to provide means whereby the momentum of the various spindles and film carriers is overcome at the conclusion of a feeding operation and prior to a re-winding operation, or prior to the projection of a still picture. Another object is the provision of braking means necessarily effective upon the film carrying means after the conclusion of a feeding movement of the film, a rewinding movement, or either of the same.

Another object of the present invention is the provision of improved means whereby a film feeding apparatus can be controlled in the manner desired.

A further object of the present invention is the provision of mechanism whereby the various film handling operations can be performed in the sequence which is desired for the particular purpose which is to be accomplished.

It will be readily understood that although the present invention is particularly useful when applied to apparatus designed for the use of amateurs as in homes or schools, it can be applied equally well to apparatus designed for professional and commercial use as in theatres.

Other objects, advantages and characteristics are apparent from the following description, the attached drawings and the subjoined claims. Although I am showing but one embodiment of my invention, it will readily be understood that I am not limited to one construction as changes can readily be made without departing from the spirit of my invention or the scope of my broader claims. It will be readily understood by those skilled in the art that the present invention applies to film handling apparatus generically and in most respects equally well to either a camera, film playing phonograph, projector or so-called talking motion picture apparatus, although in the following description I give as an example of my invention its embodiment in a projector.

It will be understood, for example, that although the handling of the film in a continuous feeding operation is described as applied to rewinding, the invention is equally applicable to other uses in which the continuous or uniform movement of the film is desirable. By way of further example, it is stated that although the bringing of the film into operative engagement with film moving mechanism is described as applied to intermittently actuated members, the invention in such respects is equally applicable to continuous feeding or taking-up sprockets associated with the conventional unsupported loops of slack film, or with continuously operated sprockets as used with the method of so-called optical rectification or the reproduction from a film or the recordation of sound upon a film.

My invention is herein illustrated as applied to an apparatus of the general character shown and claimed in the co-pending application of Barton Allen Proctor, Serial Number 332,296 filed January 14, 1929, although it will be understood that the invention is not limited to use with any particular form of film handling apparatus. Certain features of the apparatus as hereinafter described are also shown and claimed in the copending applications of said Proctor, Serial Number 54,910, filed September 3, 1925, and Serial Number 187,980, filed April 30, 1927, and in the copending application of Clarkson Ulysses Bundick and said Proctor Serial Number 44,482, filed July 18, 1925. The above applications all being assigned to the Kinatome Patents Corporation, the assignee of the present application.

In the drawings:

Figure 1 is a right side elevation certain parts of the lamp housing being broken away, and certain details being omitted for clarity. Figure 1a is a diagram showing the electrical wiring of the apparatus. Figure 1b is a right side enlarged elevation of the film moving and retaining elements. Figure 1c is a top plan view of the same.

Figure 2 is a cross section of the apparatus in projection position, taken upon the line 2—2 of Figure 1, certain parts being omitted for clarity. Figure 2a is a detail plan view taken in the direction shown by the arrows along the line 2a—2a of Figure 2. Figure 2b is a detail plan view taken in the direction shown by the arrows along the line 2b—2b of Figure 2.

Figure 4 is a partial left side elevation of the apparatus in projection-in-motion position.

Figure 5 is a partial left side elevation of the apparatus in film threading position showing the gate control mechanism. Figure 5a is a detail plan view taken along the line 5a—5a of Figure 5 in the direction indicated by the arrows.

Figure 6 is a partial left side elevation of the apparatus in film rewinding position.

Figure 7 is a partial left side elevation of the apparatus in film rewinding position with the spindles in relatively close position to accommodate carriers of relatively small capacity.

Figure 8 is a right side partial view showing the gate and a portion of the control mechanism for certain parts associated with the gate. Figure 8a shows a modification of a portion of such control mechanism.

Figure 9 is a partial top plan view of the gate and lateral positioning fingers and a portion of the control mechanism in a film threading position, and indicating the position of certain parts when the apparatus is in rewinding position.

Figure 10 is a partial top plan view of the gate and positioning members and a portion of the control mechanism in still picture projection position or in projection-in-motion position. Figures 10a and 10b are enlarged detail views of a portion of the mechanism for resetting the positioning and locking fingers.

Figure 11 is a partial right side elevation showing in skeleton form the braking mechanism and the portion of the control mechanism adapted to operate the same, the apparatus being in film-rewinding position.

Figure 12 is a view taken in the direction shown by the arrows along the line 12—12 of Figure 11. Figure 12a is an enlarged detail view taken along the line 12a—12a of Figure 12.

Figure 1:
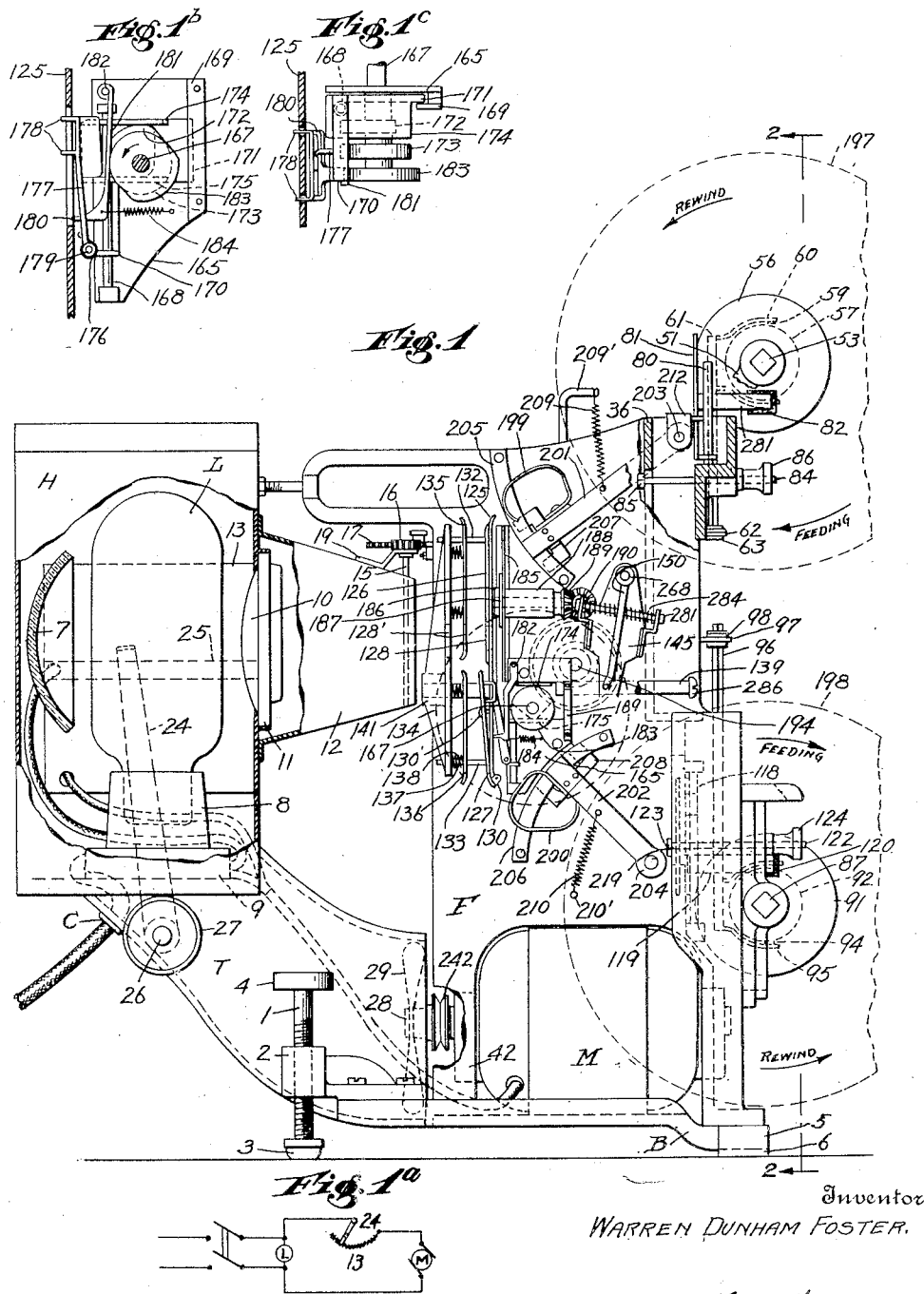

In carrying out the present invention, there may be provided an apparatus having a supporting base B having mounted thereon a ventilating tunnel T and a supporting or main frame F.

Adjusting legs 1 threaded as through lugs 2 projecting from the rear of the base B may be provided whereby the optical axis of the apparatus may be raised or lowered at will in order to place the picture upon a screen as desired. The bottoms of the adjusting screws may be provided with rubber or other suitable protective pads 3 and the tops of the screws may be provided with knurled heads 4. The forward feet 5 of the apparatus may likewise be provided with pads 6.

Upon the top of the air tunnel T, there may be mounted a housing H which may contain a mirror or other suitable reflecting surface 7, a light source L in a socket 8 supported as by a plate 9, a condensing lens 10 positioned as within in a holder 11, a forwardly facing cone 12, and a motor resistance 13. In order to protect the film while stationary in the gate from the heat of the light source, a heat screen 14, composed of fine wire mesh, or other suitable material, may be mounted within the cone 12 as upon a rotatable rod 15. To a upper portion of this rod there may be pinned the gear 16 which meshes with an arcuate rack 17 formed in a plate 18 which may be pivoted for movement as upon a bracket 19 extending from the cone 12. In order normally to position and hold such a screen in the closed or light intercepting position, a spring 20 may be attached to the plate 18 and the lamp housing H. In order that the screen may be moved from such position to allow the full light to pass through the film while in motion, a screen control rod 21, subject to adjustment as by nuts 22 threaded upon the rearward end thereof, may be attached as to an extension 23 of the plate 18. Mechanism for moving this rod in timed relation to the actuation of other portions of the apparatus will later be described.

Within the housing H, there may be positioned the motor resistance 13 attached as to the back wall thereof. A wiper arm 24, which is effective to form contact between a bar 25 and the wires of the resistance, may be controlled as by rod 26, the knob 27 of which may be conveniently positioned as below the door which may be formed in the side of the housing.

The top of the lamphouse may be constructed with louvres to permit the escape of heated air and be readily removable.

Upon the rearward end of the armature shaft 28 of the motor M, which may be mounted as upon the base B, there may be provided the fan 29, so positioned as to revolve within the mouth of the ventilating tunnel and to force air upwardly therethrough.

Figure 1a is a wiring diagram of the apparatus.

Figure 2:
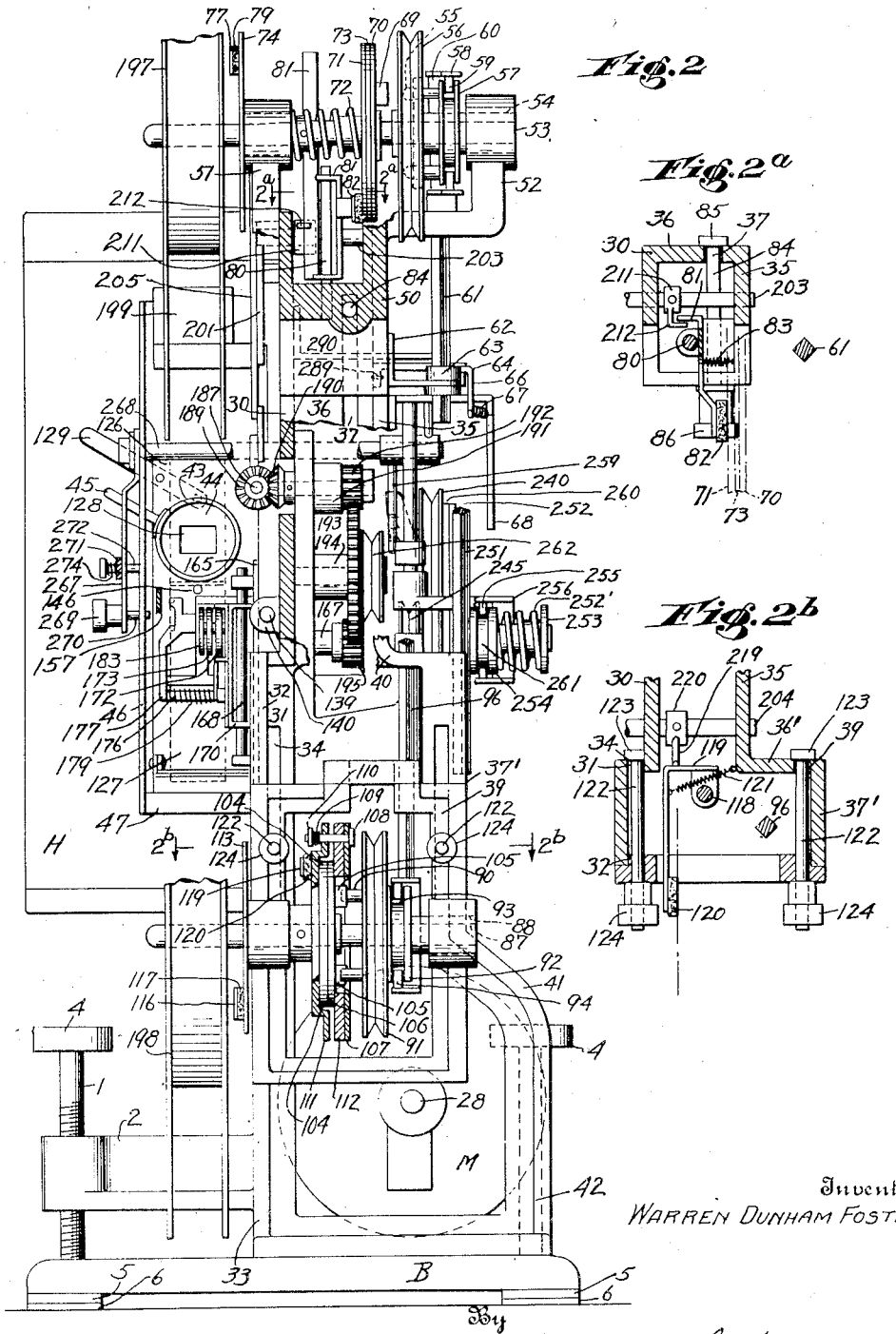

Upon the main frame F, likewise supported as by the base B, there may be positioned the objective lens and the general operating mechanism of the apparatus, including the rewinding spindle carriage, take-up spindle carriage, gate, lateral positioning and locking mechanism, film moving and retaining means, shutter, tension control mechanism, feeding brakes, automatic control, and associated parts. Such frame may be constructed in any appropriate fashion, as for example, as follows:

As is clearly shown in Figures 2, 2a and 2b of the drawings, the forward portion of the main frame F may be constructed in a form which includes substantially parallel plates 30 and 35 which with the extensions thereto form the tracks upon which the rewinding spindle carriage and the take-up spindle carriage respectively may be moved. The lower section of the main or left hand of these plates 30 as viewed in Figure 2b of the drawings may include a right angled extension 31 to its main body portion and a second right angled forwardly facing extension 32 to said first mentioned extension, this second extension terminating downwardly in a leg 33 attached to the base B. In this first mentioned extension 31 there may be provided a slot 34 for co-action with a positioning rod of the take-up spindle carriage. The upper section of the secondary or right hand plate 35 as viewed in Figure 2a of the drawings, may consist of a right angled extension 36 joining it to the main body portion of the main plate 30. In this extension, there may be provided a slot 37 for coaction with the positioning rod of the rewind spindle carriage. The lower section of such secondary or right hand plate 35 as viewed in Figure 2b of the drawings, may be of any appropriate construction whereby the take-up spindle track may be formed, together with means for the reception of the take-up spindle carriage positioning rod and support by the main frame. For example, such lower section may consist of members 36' and 37', a forward member 37' which forms the right hand section of the take-up spindle track, as viewed in Figure 2b of the drawings, and a rear supporting member 36' joining the forward section to the lower section of the main plate 35, in such supporting member 36' there being formed a slot 39 for the reception of the take-up spindle carriage positioning pin. Said lower section of the plate 35 may be joined to the upper section thereof as by a shoulder 40 and may terminate downwardly in an appropriately shaped leg 41 attached to the base B. It will be understood that the rewinding spindle carriage track is formed directly by the forward surfaces of plates 30 and 35 and the take-up spindle carriage track of more widely spaced forward extensions 32 and 37 thereof.

The lower rear portion of the main plate, may terminate in the supporting leg 42 attached to the base B.

Projecting at right angles from the left main portion of said frame as viewed in Figure 2 may be positioned the lens carrier 43 in which the objective lens 44 is inserted, means to move said lens to focus the same being provided as by a focusing lever 45 which may project through the front operating shield 46, this shield being supported in spaced parallelism to the front main portion of the main frame as by attachment to the gate and as by struts 47. It will, of course, be understood that said objective lens 44 will be placed in line with the aperture of the gate, which will later be described, condensing lens 10, light source L and mirror 7.

There may be provided a rewinding spindle carriage and a take-up spindle carriage, each of which is a self contained unit, each movable, along its respective track previously described, relatively to the other and to the optical axis of the apparatus, whereby the apparatus instantly may be made ready to accommodate reels or magazines of different diameters or capacities and each easily and completely removable from the apparatus as for repair, renewal shipment or storage.

The rewinding spindle carriage may consist of a body portion, the rear of which is shaped to cooperate with the forwardly facing plates 30 and 35 which form the rewinding spindle carriage track. Projecting upwardly and forwardly therefrom there may be provided arms 51 and 52 in which a rewinding spindle 53 may be suitably journalled for rotation, as within a bearing 54 in arm 52. The carrier mount portion of said spindle may be formed of any desired contour. To revolve said spindle in a re-winding direction, anti-clockwise as viewed in Figure 1, power may be applied through an operating clutch and a friction drive member, which may be of any desired construction.

The operating clutch, for example, may be constructed with pins 55 projecting to the left as viewed in Figure 2 through appropriate openings in a re-winding spindle pulley 56 from a collar 57 which embodies therein an annular depression 58 formed as for cooperation with the pins 59 extending inwardly thereinto from a fork 60 which may be formed at the extremity of a re-winding clutch control rod 61, the rewinding spindle pulley 56 being freely revoluble upon the outside portion of the bearing 54 within which the shaft 53 is revoluble. The ends of such pins 55 may be tapered to prevent interference with the driving block of the friction clutch, should both pin and block happen to be coaxial when the clutch is moved to operative position. As is clearly shown in Figure 3, such rod of non-circular cross section may extend downwardly as through an opening of similar cross section in a collar 63 mounted for rotation as upon a bracket 62 extending to the right as viewed in Figure 2 from the secondary plate 35 of the main frame F. A short lever 64 may extend from such collar whereby a bearing surface may be provided whereby the longitudinal movement of a rod 65 supported as by such bracket 62 may rotate such collar and such rod. To a downwardly projecting extension 66 of such lever 64 a spring 67 may be provided, the opposite end of which may be attached as to a bracket 68 supported as by such secondary plate 35. Means, later described, may be provided to give longitudinal movement to said rod 65 in timed relation to the actuation of other operations of the apparatus.

For cooperation with the pins 55 of the clutch when moved to the left as viewed in Figure 2, a driving block 69, wedge shaped to prevent interference with the ends of the pins 55, may be provided extending as from a driving plate 70 of the friction driving element which may be loosely mounted as upon the shaft 53. To the left thereof, as viewed in Figure 2, there may be placed a driven plate 71 so mounted upon the shaft as to be longitudinally movable relatively thereto as urged to right as by the spring 72 but to be revoluble therewith. Between such plates there may be positioned a friction disc 73 which may be constructed in any suitable manner.

It will be readily understood that when the rewinding spindle control rod 61 is rotated to the left as viewed in Fig. 2 by the longitudinal movement of the rod 65 and the rotation of the collar 63 the pins 55 will project through the holes of the revolving pulley 56 and engage with the block 69 of the pulley thereby communicating movement through the friction pad 73 and the plate 71 to the re-winding spindle 53. When the rod 65 is permitted free movement, by means later described, the spring 67 will rotate said collar 63 and said re-winding spindle rod to the right as viewed in Figure 2 and the pins 55 will be retracted from contact with the driving block 69 and the pulley 56 and the friction driving plate 70 will be entirely out of operative contact.

It will be also readily understood that if during the rewinding cycle the resistance to rotation of the material being wound upon the spindle exceeds a given point the friction clutch will slip and thus protect the film from undue strain.

A brake disc 74, coacting with the braking mechanism later described, may be mounted for revolution with the rewinding spindle 53. Attached to and movable with the rewinding spindle carriage may be provided a brake bracket 75 between forked ends 76 of which a braking arm 77 is carried, always in cooperative relationship with the braking control rod 78 irrespective of a position of the rewinding spindle carriage along its track. Similarly a braking pad 79 is always in cooperative position relative to the disc 74.

If desired, a braking mechanism effective during the process of feeding, the operation of which is later described, may be provided, to cooperate with the rewinding spindle 53, as is clearly shown in Figures 2 and 2a, and with the tension control mechanism. A rod 80 may be mounted in any appropriate fashion upon the rewinding spindle carriage. Pivotally mounted upon such rod, a plate 81 may be provided, one section of which may be adapted to coaction with a rewinding spindle brake hook 212, later described, and another section of which substantially at right angles to such former section may be elongated to provide a brake-arm to the forward end of which is attached a brake pad 82 adapted to bear against the driven plate 71 which may be pinned to the rewinding spindle 53 for rotation therewith. A spring 83 may be provided to urge the brake pad 82 against the disc 71.

In order to hold the re-winding spindle carriage in any desired position along the re-winding spindle carriage track there may be provided a positioning rod 84 which may project rearwardly through the slot 37 and be terminated in a head 85. The forward portion of such rod may be threaded and provided with a knurled thumb nut 86 which when tightened will be effective to draw the head of the rod against the plate 36 and so retain the carriage in any desired position.

The take-up spindle carriage, spindle, clutch and friction driving element may be constructed similarly or in any appropriate manner.

The take-up spindle carriage may consist of a body portion so constructed as to cooperate with the forwardly facing plates 32 and 37 which form the rewinding carriage track. A take-up spindle 87, the carrier mount portion of which may be formed of any desired contour, may be suitably journalled for rotation within a side member, as within the bearing 88 in the right side member, as viewed in Figure 2. To revolve such spindle in a feeding direction, clockwise as viewed in Figure 1, power may be applied as through an operating clutch and a friction driving element.

The operating clutch for example may be constructed as with pointed pins 90 projecting to the left as viewed in Figure 2 of the drawings through appropriate openings in a take-up spindle pulley 91 from the collar 92 which embodies therein an annular depression 93 formed as for cooperation with tapered clutch fingers 94 extending inwardly thereinto from a fork 95 which may be formed at an extremity of the take-up clutch control rod 96, the take-up spindle pulley being freely revoluble upon a portion of the outside of the bearing 88 within which the shaft 87 revolves. Such rod may extend upwardly, and terminate in a non-circular cross section extending through an opening of similar cross section in a collar 97 mounted for rotation as upon the bracket 98 extending to the right as viewed in Figure 1 from the secondary plate 35 of the main frame. A short lever 100 may extend from such collar whereby a bearing surface may be provided whereby the longitudinal movement of a rod 101 supported as by such bracket 98 may rotate such collar and such rod. To an upwardly projecting extension 102 of such lever 100 a spring 103 may be attached, the opposite end of which being attached as to the bracket 68. Means, later described, may be provided to give longitudinal movement to such rod in timed relation to the actuation of other operations of the apparatus.

The friction driving element may be constructed in any desired manner, as, for example, as follows: For cooperation with the pointed pins 90, a driving disc 104 may be provided, loosely mounted as upon the take-up shaft 87. The right hand surface of such disc, as viewed in Figure 2, may be serrated or formed with a succession of closely spaced wedge shaped teeth 105, whereby when such driving pins 90 are moved to the left, as viewed in Figure 2, they form immediate driving contact. A friction surface 106 of suitable material may be provided upon the outer or right hand portion of such disc as viewed in Figure 2 to form frictional contact as with a friction surface 112 of a driven annulus 107, connected as by screws 108, provided upon their outer ends with compression springs 109, the tension of which may be regulated as by nuts 110. A driven disc 111 is pinned to the shaft 87 for revolution therewith.

It will be readily understood that when the take-up spindle control rod 96 is rotated to the left, as viewed in Figure 2, by the longitudinal movement of the rod 101 and the rotation of the collar 97, the pins 90 will project through openings in the pulley 91 and the driven annulus 107 and come into driving contact with the teeth 105 of the driving disc 104, power thus being immediately applied from the pulley 91 to revolve the take-up shaft 87 through the friction surfaces 106 and 112 and the driven annulus 107 and the driven disc 111. When the rod 101 is permitted free movement, by means later described, the spring 103 will rotate such collar 97 and such take-up spindle control rod 96 to the right as viewed in Figure 2 of the drawings. It is apparent that the pins 90 will thus be retracted from contact with the driven disc 104 and the friction driving element will be entirely out of operative contact with the pulley 91.

It will be understood by those skilled in the art that the provision of yieldingly driven means for revolving the take-up spindle is necessary in order to compensate for the constantly changing diameter of the mass of film upon the take-up spindle as feeding progresses. Slippage can be regulated at will by changing the tension upon the compression springs 109.

As is clearly shown in Figure 11, a brake disc 113, coacting with a braking mechanism later described, may be mounted for revolution with take-up spindle. Attached to and movable with the take-up spindle carriage may be provided the brake bracket 114 between the forked ends 115 of which a braking arm 116 is carried, always in cooperative position relative to the braking control rod 78 irrespective of the position of the take-up spindle carriage along its track. Similarly a braking pad 117 is always in cooperative position relative to the disc 113.

As is clearly shown in Figure 2b, braking mechanism, similar in construction to that already described as effective upon the rewinding spindle, may be provided, if desired, to cooperate with the take-up spindle 87 during the feeding cycle and with the tension control mechanism. A rod 118 may be mounted in any appropriate fashion upon the take-up spindle carriage. Pivotally mounted upon such rod 118, a plate 119 may be provided, one section of which is adapted to coaction with a rewinding spindle brake-hook 219 later described, and another section of which is elongated to provide a brake-arm to the forward end of which is attached a brake pad 120 which is adapted to bear against the driven plate 111 which may be pinned to the take-up spindle 87 for rotation therewith. A spring 121 may be provided to urge the brake pad 120 against the plate 111.

In order to hold the take-up spindle carriage in any desired position along take-up spindle carriage track there may be provided the positioning rods 122 which may project rearwardly through the slots 34 and 39 and be terminated in heads 123. The forward portions of such rods may be threaded and provided with knurled thumb nuts 124 which when tightened will be effective to draw the heads of the rod against the inner portion of the surfaces 31 and 36', and so retain the carriage in any desired position.

A film gate may be provided, intermediate the rewinding spindle and the take-up spindle and extending at right angles from the main frame F.

The main plate 125 of the gate may be a right angled stamping attached to the frame F in any appropriate manner. Two front film track plates 126 and 127 may be attached thereto, an upper plate 126 bearing therein the aperture 128. In order to accommodate different types of film printing and to "frame" the picture as it is known in the motion picture art, such plate may be mounted so as to be movable substantially normally to the optical axis of the apparatus as by a framing handle 129. A lower front film track or stripper plate 127 may be pivoted as upon pin 130 for arcuate movement relative to the main gate plate, its movement away from the main gate plate being limited as by a headed pin 130' which may coact with an extension formed in such plate. This plate may be provided with openings through which the film moving and retaining fingers of the apparatus may operate.

To form the outer limit of the film channel, there may be provided an adjustable plate 131 attached to the main plate 125 (Figure 10) or reliance may be placed upon the positioning fingers, later described. To limit the film channel inwardly there may be provided the two pins 150

132 and 133 which also serve in part to guide the rear portion of the gate. Such rear portion may consist of a main rear section 134 and two film pressure plates 135 and 136 coacting with the front film track plates 126 and 127 respectively, said pressure plates being carried by said rear section as upon pins 137 about which may be coiled compression springs 138, and suitably relieved for cooperation with the moving and retaining fingers. The main rear section 134 and the upper pressure plate 135 may be formed with apertures 128' corresponding to the aperture 128 in the plate 126. The lower pressure plate 136 may be formed with openings corresponding to those in the stripper plate 127. The central portion of all of such plates which bear against the image-bearing portion of the film may be suitably relieved to prevent scratching, or the front plates 126 and 127 may be so relieved.

There may be provided a gate opening rod 139 which may pass through a suitable opening in the main gate plate 125 and be guided as by the brackets 140 and 140' projecting from the main frame F and be secured to the main rear gate section 134 as by an adjustment block 141, permanently secured to such rear gate section and movable along such rod 139 to any desired position. To secure the desired pressure upon the film in the gate, the entire rear section may thus be positioned at any suitable point along the rod 139 thus determining the effectiveness of the springs 138 when the gate is in closed position.

As is clearly shown in Figures 5 and 5a, the movement of the rod 139 may be accomplished by connection between control block 142 attached thereto and a control saddle 145. From such control block may project a pin 143 which may cooperate with an opening in one end of plate 144, to the other end of which in a suitable bearing may be rigidly mounted a plate 212', in a slot 213 of which a pin 214 attached as to the lower end of the plate 145 may move, the right hand projection of such saddle, as viewed in Figure 5, being movable between plates 144 and 212'. As such saddle 145 is moved to the left from the position shown in Figure 5, such pin 214 by bearing against the lower end of the slot 213 will move the plates 212' and 144 and the rod 139 to the left, thus bringing the gate sections 135 and 126 in relatively close relation, such sections being brought to a partially closed position while the control saddle is moved approximately one quarter of the distance between the points indicated in Figure 5 as stations S3 and S2. After such movement has been completed, the slot 213 will have been so far depressed that it offers no further resistance to the pin 214. After the saddle has been moved approximately three quarters of the distance between the stations S3 and S2, a pin 215, mounted upon the projection of such saddle extending to the right as viewed in Figure 5, will bear against the right hand portion, as so viewed, of plate 212', thus moving it and plate 144 still further to the left and closing the gate completely. At such point the pin 214 will be in the upper portion of the slot 213, the plate 212' being depressed. When the control saddle 145 is rotated to the right, as viewed in Figure 5, from station S2 toward station S3, the pin 214 will first bear against the right hand portion of the upper extension of the slot 213, then pass around its curved portion, pass freely along the right hand extension of such slot, and then bear against the upper portion of such slot, completely opening the gate.

It will be readily understood that the movement of the control saddle from station S3 to station S2 will first quickly bring the gate to a partially closed position, leave it in such position for a period, and then quickly completely close it. Movement of such control saddle in a contrary direction between such stations will open the gate.

As is clearly shown in Figures 9 and 10, to move the stripper plate 127 upon the pivot 130, a stripping rod 146 may be provided, the left end of such rod, as viewed in Figure 9, passing through an opening in the gate section 125 and resting against the right hand or forward surface of the stripper plate, 127, which may be held in an inoperative or upright position as by the flat spring 231 (Figure 5) which may bear against the head of the pin 232 attached to such stripper plate. Such rod 146 may be guided as by the main gate plate and by the brackets 147 and 148 attached to the front shield 46 and limited in respect to movement forwardly as by the block 149, attached to such rod, which may co-act with the bracket 148. Longitudinal movement may be communicated to such stripper rod as by the movement of the control arm 150 to the left as viewed in Figure 9 of the drawings, the end of the control arm bearing against the control block 151 attached to the stripper rod. Means, later described, to move such control arm in timed relation to the actuation of other operations of the apparatus, may be provided. It will be readily understood that when the stripper plate is so moved it will remove a film f within the gate of the apparatus from the moving or retaining teeth of the apparatus and will protect it therefrom. It will also be understood that the point at which the block 151 is placed upon the rod 146 will time the operation of the stripper plate.

As the gate is closed by the movement of the rear sections, to the right as viewed in Figures 9 or 10, the control arm moves to the position shown by Figure 10 and the stripping rod is moved forwardly by the pressure of the stripper plate 127 against its rearward end, this pressure being caused by the spring 231 (Figure 5).

In order to position the film laterally within the gate and to hold it therein during re-winding as well as the projection cycle, the positioning fingers 152 may be provided as is clearly shown in Figures 8, 9 and 10 of the drawings. Such fingers may be mounted for arcuate movement as upon a perpendicular rod 153 supported in any appropriate manner substantially parallel to the direction of travel of the film through the gate and urged inwardly as by the spring 154, (Figure 8).

The control cam 155, adapted to cooperate with the right angled projection 156 of the rear end of the trigger 157, may be attached to such rod. Such trigger may be pivoted as upon the stud 158 and be held under the tension of the flat spring 159. The forward end of such trigger may have a deflected portion 160 and the central section a deflected portion 161. As the control arm 150 is moved to the right, from the position shown in full line in Figure 9 to that shown in Figure 10, it bears against such forward deflected portion 160 of such trigger and moves such trigger so that the right angled extension 156 is moved inwardly, and away from the flat face of the cam, thus permitting the spring 154 quickly to rotate the fingers 151 from the position shown in full line in Figure 9 to that shown in dotted line. The gate plate 125 and the guide plate 131 may be formed with openings through which such fingers may operate. Thus it will be seen that such rotation of such fingers will force the film laterally within the gate and in proper position relative to the film-moving means later described and also that it will hold it within the gate.

As such control arm 150 is moved to the left from the position shown in Figure 10 or that shown in full line in Figure 9 to that shown in dotted line in Figure 9, it bears against the rear deflected portion 161 and moves the trigger so that the extension 156 is again brought inwardly, thus permitting the spring 154 to rotate the fingers 152 from the position shown in full line in Figure 9 to that shown in dotted line.

In order automatically to reset such positioning fingers 152 after a rewinding operation, a flat thin resilient strip 223 may be provided, attached at one end to a lateral extension 224 of the sleeve 225 which may be mounted over the shaft 268 and attached to the control finger 150 for movement therewith, and at the other end moving longitudinally within a suitable bearing 162 attached as to plate 46. The left end of such strip, as viewed in Figures 9 and 10, may be deflected slightly, and at the right of such deflection have an elongated slot 226 (Figure 8) adapted to engage with the pin 227 attached to and extending from the rod 153 at approximately right angles to its axis. By reason of this construction, it will be apparent that when the strip 223 is moved to the left from the position shown in Figure 9 or 10, the deflected portion will slip over the outer end of the pin 227, which will then be in the position shown in Figure 10, until the slot 226 and pin engage. Then, as the strip 223 is moved to the right toward the position shown in Figure 9, the pin will be moved therewith, the rod 153 and fingers 152 rotated to the completely open position and held there by engagement between the control cam 155 and the projection 156. This position will be reached, however, before the strip 223 has been moved completely to the position shown in Figure 9. Before it reaches such position, the left hand end of the slot will have been drawn over and beyond the end of the pin 227 and freed from contact therewith so that the fingers are free to move when released.

To reset such positioning fingers 152 after a projection in motion operation, similar mechanism may be provided. A thin strip 228 may likewise be attached to such extension 224 of the sleeve 225 and also guided by the bearing 162. As the control arm 150 is moved to the left as viewed in Figure 9 or 10, the deflected left end of such strip 228 will ride upon the forked guide member 229, as clearly shown in Figures 10a and 10b, and by engagement with the pin 227 which extends through such guide member, rotate the rod 153 in a counter clockwise direction, as viewed in Figure 10a, and reset the positioning fingers 152. Such resetting is accomplished before the control arm 150 has reached the full line position of Figure 9. When such control arm has reached such position, the left hand end of strip 228 will have been guided out of contact with pin 227, leaving such pin free to move when the control cam 155 is again released. Further movement of the strip 228 will be without effect, its left hand portion, as viewed in Figure 10a, merely riding further upon the guide 229 and into a slight recess formed in the right hand side of plate 125, as viewed in Figure 9.

Under certain conditions, particularly when it is desired to actuate the stripper just previously to the opening of the gate, a modification of the above described mechanism may be employed. As is clearly shown in Figure 8a, the arm 150' may be provided, attached to and movable with the control saddle 145, such control arm 150' otherwise being of characteristics similar to those of control arm 150.

Means, later described, may be employed to move the control arm 150 or 150' in timed relation to the actuation of other operations of the apparatus.

To move the film intermittently through the gate any suitable mechanism may be employed. It may be preferred, however, to construct such movement as follows:

As is clearly shown in Figures 1b and 1c, such movement may be mounted as upon a plate 165 supported as upon the main frame F. Upon the rearward portion of such plate there may be attached a guide rod 168 and upon the forward portion thereof there may be placed a spaced guide 169. Adapted to movement along such guide rod 168, there may be provided an intermittent carriage 170, an extension 171 from said carriage moving within the slot formed between such guide 169 and such plate 165. There may be positioned upon the main operating shaft 167 a heart shaped cam 172 and a pusher cam 173, the latter of which is mounted upon an extension of the hub of the former. Coacting with the surface of cam 172 may be the two shoulders 174 and 175 formed in the surface of the intermittent carriage 170. The surface of the cam 172 may be of any appropriate contour whereby when such cam is revolved as by the shaft 167 the intermittent carriage is intermittently moved upwardly and downwardly. Pivoted to the lower portion of such intermittent carriage 170 as by the rod 176 there may be provided the moving fingers plate 177 formed preferably of one piece so shaped as to embody four forwardly facing moving fingers or teeth 178. The surface of the cam 173 may bear against the inner portion of such intermittent fingers plate and be constructed of such contour as to force it to the left as viewed in Figure 1b at the moment of the conclusion of the upward movement of the intermittent carriage 170 and to retain it in such forward position during the downward movement of such carriage. At the conclusion of such downward movement the moving fingers 178 may be disengaged from the perforations in the film as by the spring 179, the contour of the cam being such as to permit this movement to the right as viewed in Figure 1b of the drawings.

In order that the film may be held firmly in the gate during the period of exposure, retaining teeth or fingers 180 may be provided.

Two such fingers 180 may be formed as in the end of the retaining fingers plate 181 pivoted as upon the rod 182 fixed to the plate 165, such teeth operating within the opening provided in the moving fingers plate 177. Bearing against the right hand surface of such retaining fingers plate 181, as viewed in Figure 1b, may be provided the retaining fingers pusher cam 183, which may be mounted as upon the extended hub of the heart shaped cam 172. Such pusher cam 183 may be a duplicate of intermittent fingers pusher cam 173, but mounted at substantially 180 degrees rotation relatively thereto. The retaining fingers plate 181 may be withdrawn from the perforations of the film as by the spring 184.

By reason of the above construction it will be evident that the retaining fingers 180 will be in contact with the perforations of the film during the period in which the moving fingers 178 are out of such contact. It may be preferred that the contour of the cams be such that before the retraction of one set of fingers the other set of fingers will be introduced therein, thus retaining the film under proper control at all times.

Cooperating with the intermittent movement, such as that described above, and with the aperture 128, a shutter, as is well known in the art, may be provided. It may be preferred adjustably to mount such a shutter 185 upon the shutter support 186 attached to the end of the shaft 187 which is suitably journalled for rotation as in the extension 188 which may be formed as upon the plate 30 of the main frame and terminate in the bevelled gear 189 which meshes with the bevelled gear 190 upon the shaft 191, suitably journalled for rotation within and at right angles to such plate 30 such shaft having attached to the opposite end thereof the spur gear 192 which through the gear 193, mounted as upon the shaft 194, suitably journalled for rotation, meshes with the gear 195 attached to the main operating shaft 167. Thus it will be understood that the revolution of the operating shaft 167 will operate the film moving mechanism and the shutter simultaneously.

In order to eliminate the necessity of providing for unsupported loops of slack film as has been common in the art in order to compensate for the differences of character in movement in the continuously rotating supply and take-up spindles and the intermittent operating feeding members there may preferably be employed the tension-control system of feeding, certain features of which are disclosed and claimed in the copending application of Clarkson Ulysses Bundick and Barton Allen Proctor, Serial Number 44,482, filed July 18, 1925, assigned to the same assignee as is the present application.

The film passing from the supply reel 197 upon the delivery spindle 53 to the reel 198 upon the take-up spindle 87 and through the gate preferably passes over the spring tension pads 199 and 200 carried respectively by tension control arms 201 and 202 having respective pivotal mountings 203 and 204 upon the frame F, and being guided against lateral movement as by the guide plates 205 and 206, supported in spaced relationship to the frame F, with which the left hand ends of the tension control arms as viewed in Figure 1 of the drawings and the guiding extensions 207 and 208 co-act. To the tension arms are attached the tension springs 209 and 210 respectively secured at one end to their cooperating tension arms and at the opposite end to appropriate members 209' and 210' projecting from the frame F.

During the feeding cycle, as the film travels from such supply reel to such delivery reel, each of which is revoluble in the direction indicated by the appropriate arrows in Figure 1, urged by the intermittent mechanism hereinbefore described, it is at once placed under a condition of tension. This causes the upper tension arm 201 through its pad 199 to be depressed as viewed in the drawings whereby the spring 209 is placed under a condition of increased tension. A portion of the pull so exerted upon the film is directly communicated to the mass of film carried by the supply reel 197, and a small portion of the film drawn therefrom. As the film comes to rest in the gate hereinbefore described in detail, the tension arm 201, urged by the power thus previously stored in the spring 209, moves upwardly and draws from the reel an additional supply of film. Simultaneously with the conclusion of this upward movement, however, the intermittently operated moving element is again in action and the film is again pulled downwardly through the gate. The length of film required to compensate for that moved downwardly is drawn in part directly from the source of supply upon the reel 197 and in part from the amount of film which has been fed forwardly by the previous upward movement of the tension arm 201. Since in the spindle 53 there is a certain resistance to rotation by reason both of inertia and friction, the reel 197 is caused to move at intermittently varying rates of speed at different parts of each feeding cycle; but in actual practice, it has been found that under ordinary conditions or operation it never comes to a complete stop. The flat spring constituting the pad 199 also serves as a cushioning medium between the intermittent feeding mechanism and the film on the supply reel and as supplemental to the action of the spring 209.

Below the gate the corresponding tension arm 202, with its spring pad 200 over which the film travels, operates in substantially the same fashion. As the film is pulled downwardly by the action of the intermittent feeding mechanism, the tension of the spring 210 operating through the arm 202 causes the spring pad 200 to remain in contact with the film and to keep it under tension. In the meantime, however, the rotation of the take-up spindle effected by mechanism hereinbefore described, tends to wind the film upon the yieldingly driven take-up reel 198 and to increase the tension of the spring 210 ready for the beginning of the next cycle of operation. Thus the tension of the film itself and of the spring 210 is opposed to the driving means for the spindle 87, the balance between the two in the invention herein disclosed being maintained primarily by and through the film. The flat spring constituting the pad 200 is supplemental to the action of the spring 210 and serves as a cushioning medium for the film.

From the foregoing, it will be apparent that from the beginning of the feeding movement the film is automatically placed under the desired condition of tension without any attention by the operator, and that this condition is automatically maintained during the operation of the apparatus.

Experience has demonstrated that the above method of feeding film whereby it is maintained under conditions of continuously controlled tension throughout the entire operative or unwound length of the film from the supply reel to the take-up reel and whereby the two reels are moved in certain timed relation or synchronism with the intermittent movement at the gate, effects a feeding of the film with considerably less wear to the perforations than is possible with the conventional method of feeding involving the use of continuously rotating feeding and taking up sprockets associated with unsupported loops of slack film. Although it is preferred to utilize a tension control as herein described, it will be understood that the utility of the invention is not limited with respect to the particular mechanism for effecting film feeding and that any desired form of sprockets, take-up mechanism, and the like, with their associated loops of slack film or any other desired mechanism, may be used if preferred.

Under normal conditions of feeding it has been found entirely practical to rely upon the tension control apparatus as above set forth but in order to compensate for unusual conditions of feeding which may be caused by improperly lubricated bearings, poorly wound films, temperature changes and the many other minor emergencies which continually occur in a film feeding apparatus, it has been found desirable to supplement the above described tension control means with a braking mechanism.

The shaft 203 upon which the tension arm 201 is pivoted may extend through plates 30 and 35 of the frame F. Attached to such shaft there may be provided a block 211 with the rewinding spindle brake hook 212 extending forwardly therefrom and adapted to cooperate with the plate 81 which is rotatable upon the rod 80 perpendicularly mounted upon an appropriate portion of the re-winding spindle carriage, as has previously been described.

It will be readily understood that as the tension arm 201 is depressed the shaft 203 and the plate 81 will be rotated against the pressure of the spring 83 whereby the brake pad 82 is removed from co-action with the plate 71 or its pressure thereupon greatly reduced. Thus if the film is not fed from the reel 197 upon the rewinding spindle 53 with normal rapidity, the braking pad 82 is removed from co-action therewith and the pressure therebetween much reduced thus permitting the spindle to be revolved more rapidly by the pull of the film. If on the other hand the film tends to be fed too rapidly and to over run, the tension arm 201 is permitted to move upwardly thus applying braking pressure to the rewinding spindle.

There may be provided similar braking mechanism cooperating with the tension arm 202 between the intermittent feeding member and the take-up spindle. As the tension arm 202 is moved upwardly by pressure thereupon from the film caused by too rapid rotation of the take-up spindle, the take-up brake hook 219 attached to the pivotal shaft 204 as by means of the block 220 bears against the surface of the plate 119 thus moving it against the pressure of the spring 121 and removing the brake pad 120 from the plate 111 of the take-up spindle clutch, or reducing its pressure thereon. Thus it will be understood that as the take-up spindle 87 tends to rotate too rapidly, the braking pad is applied thereto and its speed diminished and greater length of film is permitted to accumulate between the intermittent moving member and take-up reel. If on the contrary this amount of film becomes too great the tension arm 202 moves downwardly thus reducing the braking pressure and permitting the take-up spindle to revolve more rapidly.

It will readily be understood that the proper conditions of film feeding are maintained at all times, the strain upon the film very much reduced, and the threading of the film into operative position much expedited.

It will be understood that apparatus according to my invention may be constructed to operate with unsupported loops of slack film, formed as by the operation of the so-called continuous sprockets, or with optical rectification, so-called.

To operate the apparatus, power may be applied to the main operating shaft 167 through an operating clutch, the driving portion of which is effective to revolve the driving pulley of the rewind spindle clutch.

The main driving pulley 240 may be mounted loosely as upon the operating shaft 167, and driven as by the motor M as by means of the belt 241 passing over the pulley 242 which may be pinned to the armature shaft 28 of the motor, and the idler 243, revoluble as upon the stud 244 extending from the main frame F. As is clearly shown in Figure 7, the pulley 245, of any suitable diameter, may be formed upon or attached to such main driving pulley in line with the driving pulley 56 of the rewinding spindle carriage, power being communicated as by means of the belt 246 which may pass over the double idlers 247, which may be suitably mounted for rotation as upon the lever 248 which may be appropriately pivoted to the main frame as upon the pin 249, such lever being urged to the right as viewed in Figure 7 as by the spring 250. Thus it will be understood that irrespective of the position of the rewinding spindle carriage upon the rewinding spindle carriage track, the belt 246 will be kept tight and fully operative.

The driven portion of the main operating clutch may consist of the disc 251 to the left side of which, as viewed in Figure 2, there may be attached a friction surface 252 of leather or some other suitable substance, the disc 251 being pinned to the operating shaft 167 and being urged to the left, as viewed in Figure 2, or operative position, as by the spring 252' which may bear against the head 253 of the operating shaft 167 and the collar 254 formed as upon the driven disc 251. Fingers 255 extending as from the forked end of the clutch control arm 256 may be provided to co-act with the annular depression 261 formed in the collar 254. In order to hold the clutch to the inoperative or right hand position as viewed in Figure 2, the control arm 256 may be attached to the rod 257 supported as in the brackets 98 and 62 extending as from the plate 35 and attached to the control plate 258, the rearward or right hand end of which, as viewed in Figure 3a, bears against the rod 259 which is rotatable with the main control shaft 268. By reference to Figure 3a, it will be seen that as such rod 259 is positioned at station S2 or at stations S3 or S4 or therebetween, such rod 259 and the rod 257 and control arm 256 will hold the main clutch in inoperative position, and that as such rod 259 is moved from station S2 to station S1, or from station S3 toward station S2, the main clutch will become operative since the rod 257 and control arm 256 may then be rotated by the pressure of the spring 252' and the friction surface 252 will bear upon the friction surface 260 which may be affixed to the appropriate side of the driving pulley 240. As the main control shaft 268 is rotated away from position S1, to position S2, the arm 256 is moved in the opposite direction, the spring 252' is compressed, and the clutch made inoperative. Likewise, as the rod 259 is moved completely into position S2 from position S1, the clutch will be rendered inoperative.

The pulley 262 may be attached to and revoluble with the spur gear 193 which, as previously described, enmeshes with the spur gear 195 which is pinned to the operating shaft 167. As is clearly shown in Figure 7 of the drawings, the revolution of such pulley may drive the take-up spindle pulley 91 as by means of the belt 263 passing therebetween and over the idler 264 rotatable upon the belt tightening lever 264' which is pivoted as upon the pin 265 in the main frame F and urged to the right as viewed in Figure 7 as by the spring 266, thus assuring the operativeness of the belt 263 irrespective of the position of the take-up spindle carriage along the take-up spindle track.

In order to render the operation of the apparatus simple and automatic and within the capacity of an unskilled or amateur operator, there may be provided unitary means for controlling in the manner desired all the operations of the apparatus. The control mechanism per se, herein described, is an improvement upon that disclosed and claimed in the co-pending application of Barton Allen Proctor Serial Number 54,910 filed September 8, 1925, assigned to the same assignee as is the present application.

For such control of the apparatus, there may be provided a primary control member 267 pinned to the main control shaft 268 and movable through an arc. Upon the lower end of this lever, there may be provided a knob 269 terminating inwardly in a pin 270 adapted to cooperate with the openings in the plate 46, such openings representing the different operating stations and designated as station S1, station S2, station S3, and station S4 respectively, such stations respectively representing a projection-in-motion position, a still projection position, a film threading position, and a rewinding position. To insure the positioning of such a pin when moved into each such station, the lever 267 may be constructed of spring metal and further restricted in its outward movement an urged inwardly as by the bar 271, which bar is movable toward and away from the plate 46 as upon the headed pins 272 and urged inwardly thereupon as by the springs 274. Such spring pressure will prevent a careless operator from moving the control handle too rapidly from station S3 to station S2. As previously stated, the control saddle 145 may be loosely mounted upon the control shaft 268. The control arm 150 may be pinned to such shaft 268.

Mounted as upon a rod 281 which may be supported upon and between shoulders 282 and 283 of the control saddle 145 there may be provided the compression springs 284 and 285, the ends of which bear against the sides of the control arm 150. The movement of the control saddle may be restricted. As it is moved to the right as viewed in Figure 8, the right side of the lower portion of such saddle may bear against the left side of the bracket 140, as viewed in Figure 9. Similarly, movement to the left as viewed in such Figure 9 may be restricted as by the head 286 of the rod 139 bearing against the right side of the bracket 140. It will be readily understood, however, that the control shaft 268 may be rotated further to the right as viewed in Figure 8, the control arm 150 compressing the spring 284, and further to the left, such arm 150 compressing the spring 285.

In case use is made of the modified construction shown in Figure 8a, a spring compression lever 150'' may be attached to the shaft 268 and coact, as above described, with such springs 284 and 285.

The main control shaft 268 may extend through the plate F, and upon the other side of such plate loosely mounted on such shaft may be provided the take-up spindle actuating plate 287 and attached to such shaft and rotating therewith there may be provided the pin 259, the movement of this pin being effective to operate the main operating clutch, the take-up spindle clutch and heat screen, and the rewinding spindle clutch.

As previously described, the lower portion of such pin may cooperate with the control plate 258 to control the main operating clutch. The upper portion of such pin 259, as is clearly shown in Figures 4 and 6 may be bent to the right as viewed in Figure 4 and terminate in a right angled portion which when moved to the position shown in Figure 4 will bear against a right angled projection 288 formed upon one end of the plate 289 to rotate the same. Such plate 289 may be mounted for rotation as upon the bracket 290 which may be attached to the main frame F. To the opposite end of said plate, the heat screen control rod 21 may be attached, whereby such rotation of such plate 289 moves the heat screen 14 to inoperative position.

Figures 3, 3A:
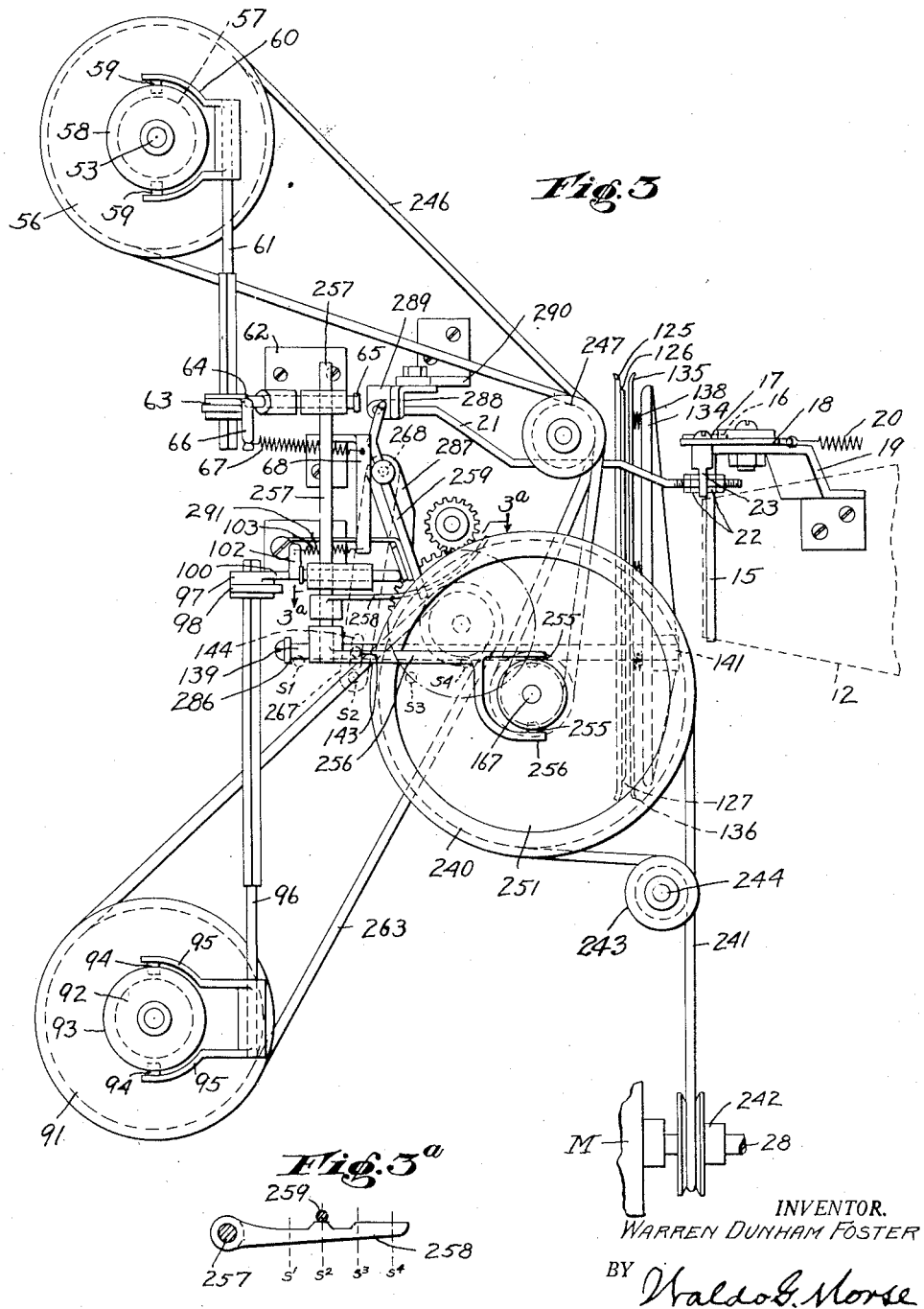
Figure 3 is a partial left side elevation of the apparatus in the single picture position.
Figure 3a is a partial plan view taken in the direction indicated by the arrows along the line 3a—3a of Figure 3.

Such movement of such pin 259 from the position shown in Figure 3 to that shown in Figure 4, will also be effective to actuate the take-up spindle clutch since the lower end of the pin 259 will bear against the left side of the right angled projection of plate 287 thus forcing it against the pin 101 and thereby actuating the take-up spindle clutch as previously described. The detent 291 may be provided to limit the movement of such plate 287 to the right, as viewed in Figure 6, after contact of the pin 259 has been removed therefrom.

The rotation of the shaft 268 to the position shown in Figure 6 of the drawings will be effective to bring the upper portion of the pin 259 against the end of the rod 65 thus longitudinally moving the same and actuating the rewind spindle clutch.

Connection between the main control shaft 268 and the brake control rod 78 may be secured in any appropriate manner, as for example, as is shown in Figures 11, 12 and 12a, whereby the braking members are applied at the conclusion of either a rewinding or a feeding movement.

Loosely mounted upon the brake rod 78, there may be provided the collar 292, such rod and collar being of similar non-circular cross section. Such collar may include an extension as at right angles to the axis of such brake rod, near the outer end of which there may be provided an opening into which the bent end of the rewinding brake control operating rod 293 may fit, as is clearly shown in Figure 12a. It will be readily understood, therefore, that the longitudinal movement of such operating rod will be effective to rotate such brake rod. Such longitudinal movement may be imparted as by the rotation of the collar 294 which may be loosely mounted upon the main control shaft 268 and to which there may be pivotally attached the pawl 295, which may be urged downwardly as by the spring 296, its downward movement being limited as by the stop 297 affixed to and projecting from the collar 294. Such collar 294 may be urged downwardly as against the stop 298 as by the spring 299. Pinned to the main control shaft 268 adjacent to the collar 294 and in line with the member 267 may be provided the tooth 300. As the main control member 267 is rotated to the right, as viewed in Figure 11, from station S4 toward station S3, the pawl 295 will remain in operative relation with the control tooth 300 whereby the movement of the main control member 267 will be communicated to and will rotate the brake rod 78 thus applying the brakes 79 and 117. As the main control lever is rotated to the right of the station S3, as viewed in Figure 11, toward the station S2 the movement of the pawl and its supporting collar 294 jointly with the main control arm 267 will be interrupted by the engagement of the extension 301 of the pawl 295 with the stop 302 whereby the tooth of the pawl is removed from engagement with the control tooth 300 and snaps back, urged as by the spring 296, thus permitting the collar 294 to be moved downwardly by the spring 299 to the stop 298. Thus the brake rod 78 will be rotated to the left as viewed in Figure 11 and the brake pads 79 and 117 removed from operative position. As the main control member is rotated to the left as viewed in Figure 11 from station S3 toward station S4 the tooth 300 will again engage with the tooth of the pawl 295 and set the re-winding brake control mechanism in position for operation as above described when said control lever is again rotated to the right as viewed in Figure 11.

To operate such braking members at the conclusion of a projection operation, similar mechanism may be provided. The projection brake control rod 303 may be attached to the projection of the collar 292 opposite to that to which rod 293 is attached. To impart longitudinal movement to such rod 303 and to apply the brakes, the collar 304 may be loosely mounted upon the control shaft 268, to the left, as viewed in Figure 12, to the mounting of the rewinding collar 294. To such collar 304, there may be pivotally attached the pawl 305, which may be urged downwardly as by the spring 306, its downward movement being limited as by the stop 307 affixed to and projecting from the collar 304. Such collar 304 may be urged downwardly as against the stop 308 as by the spring 309. Pinned to the main control shaft 268 adjacent to the collar 304 and in line with the member 267, may be provided the tooth 310. As such control member 267 is rotated to the right from station S2 to station S1, such tooth 310 will engage with a cooperating portion of the pawl 305. As such control member 267 is rotated to the left away from station S1 toward station S2, the pawl 305 will remain in operative relation with the control tooth 310 whereby the movement of the main control member 267 will be communicated to and will rotate the brake rod 78 thus applying the brakes 79 and 117. As such control lever is rotated to the left of station S2 as viewed in Figure 11 toward the station S3, the movement of the pawl and its supporting collar 304 jointly with the main control arm 267 will be interrupted by the engagement of the extension 311 of the pawl 305 with the stop 312 whereby the tooth of the pawl is removed from engagement with the control tooth 310 and snaps back, urged as by the spring 306, thus permitting the collar 304 to be moved downwardly by the spring 309 to the stop 308. Thus the brake rod 78 will be rotated to the left as viewed in Figure 11 and the brake pads 79 and 117 removed from operative position.

In order to make clear the automatic operation of the apparatus by means of the mechanism which has been described above, the following description is given by way of illustration:

The user first turns on the current, thus illuminating the light source L and actuating the motor M. It will be understood that during the entire period of operation of the mechanism the motor and lamp remain operative. Thus the cooling means is continuously operating and at all times sufficient light is provided through the heat screen 14 to illuminate the film gate and to enable the user to see what he is doing.

It will be assumed that the control member 267 is situate in the film threading position S3 with the pin 270 in the appropriate opening in the plate 46, the lateral positioning fingers 152 being in the open position with the flat portion of the control cam 155 against the right angled extension 156 of the trigger 157. The user may then place the full reel of film 197 upon the spindle 53 and lay the film over the tension pad 199, through the gate, over the tension pad 200 and place the end within an appropriate fastening not shown upon the reel 198 upon the take-up spindle 87. In place of an open reel, a film magazine of any desired characteristics may be used.

The user thereupon may move the control member 267 from station S3 toward station S2 and in the manner previously described the trigger 157 is released and the lateral positioning fingers move the film completely within the gate and lock it therein. The gate, by the movement of the rod 139, as previously described, will be quickly brought to a partially closed position. At this point, the rod 259 will have passed into the depressed portion of the control plate 258, thus actuating the main clutch and placing the moving teeth 178 and the retaining teeth 180 in operation. The partial closing of the gate will have brought the film within the range of operation of such fingers, but will not have proceeded sufficiently far to have placed or held the film under tension. No pull will be exerted upon the end of the film since the take-up is idle. The lateral positioning fingers will hold the perforations of the film substantially in line with the path of outward movement of the teeth and locked against movement beyond the film channel. It will be readily understood that during this period in which the teeth are groping, so to speak, for the appropriate perforations, the film is so held that this groping is assisted and that the possibility of injury to the film is extremely remote. As the movement of the control member is continued to station S2, the moving and retaining teeth become inoperative, as the rod 259 is moved by the protuberance in the plate 258 shown at the line S2 in Figure 3a. Generally, the second cycle of movement of the teeth 178 will be sufficient to have placed the film in complete operative relation with the moving and retaining mechanism, but under ordinary conditions of operation, a slightly longer period of operation will be provided. It will be understood that the inertia of the clutch members will be sufficient to delay its operation until the gate is in the partially closed position, even though the rod 259 is moved substantially simultaneously with the movement of the control lever away from station S3.

It will of course be understood that the movement of the control member 267 to station S2 will be carried out without interruption, and that the operation described above will have been accomplished entirely automatically and in a very brief space of time. With the control mechanism at station S2 the parts will be found in the position clearly shown by Figure 3. In the manner previously described, the gate control rod 139 and the stripping rod 146 will have been moved to the position shown in Figure 10 of the drawings, and the stripping plate 127 moved into alignment with plate 126 by the action of the spring 231 (Figure 5). Light from the source L, condensed by the lens 10, will be projected through the film opposite the aperture 128, the objective lens 44 and upon the screen, the heat shield 14, still in light intercepting position in the mouth of the cone 12, protecting the stationary film from the full heat of the light source. If the film is of sixteen millimeter in width, with one perforation at each side of each frame line, it will have been completely "framed".

The user may thereupon move the control member to station S1, thus further rotating the main control shaft 268 in an anti-clockwise direction. The control saddle 145, as previously described, will move no further, the spring 284 having been compressed. The operating parts for the heat screen and for the take-up spindle clutch will now be found in the position clearly shown by Figure 4, the rotation of the main control shaft 268 having moved the right angled extension of the rod 259 against the extension 288 of the plate 287 thus in the manner previously described moving the heat shield 14 to inoperative position in the cone 12 of the lamp house and the movement of the lower portion of the rod 259 having moved the lower portion of the plate 287 against the longitudinally movable pin 101 thus rotating the take-up spindle control rod 96 and placing the take-up spindle in operation.

In the manner previously described, the control plate 258 will have been moved clear of contact with the rod 259, thus permitting the main operating clutch to become operative to drve the film moving mechanism and the shutter. It will, of course, be readily understood that the user may move the control member directly from station S3 to station S1 thus placing the apparatus in complete motion picture projecting position at once.

If the user wishes to interrupt the projection of pictures in motion to observe a single picture at leisure he will move the control member 267 from station S1 back to station S2 thus declutching the take-up spindle in the manner previously described and by the compression of the spring 252' breaking the connection between the film moving and retaining mechanism and the shutter and the source of power, and by the movement of the rod 259 away from the extension 288 of the plate 289 permitting the spring 20 to become operative to move the heat screen 14 to the closed position in the mouth of the cone 12. The movement of the rod 303 will have overcome the momentum of both the delivery and take-up spindles, thus preventing strain between the perforations of the film and the moving or retaining teeth and the over running of the film above the gate.

It may be assumed that while the forward or leader end of the film is attached to a carrier in position upon the take-up spindle 87 the user wishes to remove the film from the apparatus. He will thereupon move the control member 267 to the left as viewed in Figure 1 to station S3, thus in the manner previously described automatically opening the gate and moving the positioning and locking fingers 152 to inoperative position and setting them ready for future use. Thereupon by a lateral movement of the film or of the carriers therefor, he may remove the film from the apparatus.

It will, of course, be readily understood that the user may proceed direct from station S1 to station S3 without stopping at an intermediate station.

It may also be assumed that the user wishes to rewind the film. In that event, he will move the control arm through station S3 to station S4, the lateral positioning fingers 152 again moving into closed position. The arm 150 will move the block 151 from the position shown in full line in Figure 9 to the position shown in dotted line and thus move the rod 146 to the left as so viewed and actuate the stripping plate 127. With the control arm at station S4, the parts will be in the position shown in Figure 6 and the rewind spindle clutch will have been actuated by the movement to the left as viewed in such Figure 6 of the rods 259 and 65 and the rotation of shaft 61. The rod 259 wil have moved between lines S3 and S4 upon control plate 258 as shown in Figure 3a, and the operating or feeding clutch remain inoperative.

The rewinding operation is normally carried out at very high speed, with entire safety to the film since its perforations are completely out of contact with any teeth and it is completely protected therefrom as by the stripping plate 127 and locked against lateral movement as by the fingers 152. It will be readily understood that in many cases, the user will not care to rewind the film immediately after its projection, but will place it upon the apparatus at another time in order to carry out the rewinding operation. In such cases, the provision of positioning and locking fingers necessarily effective before as well as during a rewinding operation will be particularly useful.

If the user wishes to rewind only a portion of the film and then reproject such portion, injury to the film might be caused except for the provision of the brake previously described.

As the user moves the control member 267 from station S4 to station S3, he applies braking pressure to both rewinding and take-up spindles and to the carriers thereupon. The longitudinal movement of the arm 293, urged by the collar 294, pawl 295, and tooth 300 will rotate the shaft 78 and apply the brakes 79 and 117 to the braking discs 74 and 113. At the same time, the positioning and locking fingers 152 are moved to inoperative position and reset for future use.

It may be assumed that the user wishes to make use of a film magazine or other carrier constructed for the short length of film and hence of relatively small radius. Provision is made whereby the distances between the centers of the spindles may be instantly changed to accommodate a double or single magazine or a reel of any desired size, such as for example, the commonly used 16 millimetre four inch or seven inch reel.

To make such an adjustment, the user loosens the thumb screws 86 and 124 and moves the re-winding spindle carriage along the re-winding spindle carriage track and the take-up spindle carriage along the take-up spindle track until the spindles 53 and 87 are situate at whatever distance from each other may be necessary to accommodate the carrier or carriers which are to be used. Thereupon the user tightens such thumb nuts thus maintaining the two carriages in the desired relationship to each other and to the optical axis of the apparatus.

It will be understood that the belt tightening mechanism previously described will have been operative both to take up any slack which may have been created in the belts and also to position the belts properly.

The position of the parts when the spindles are in relatively close relation is clearly shown in Figure 7.

It will also be understood that the re-winding spindle control rod 61 will have been moved downwardly through the appropriate opening of the collar 63 and will be operative in the new position. It will also be understood that the upward movement of the take-up spindle carriage will have moved the take-up spindle control rod 96 through the appropriate opening in the collar 97, these parts also being in operative relationship at the new position. Similarly the rewinding spindle brake hook 212 will have remained in contact with the plate 81 and the take-up spindle brake hook 219 will likewise have remained in contact with the surface of the take-up spindle plate 119. Similarly the brake arms 77 and 116 will move with their respective carriages and be operative at any position.

It will be understood that in apparatus constructed in accordance with the present invention, the lateral positioning and locking mechanism is necessarily rendered effective prior to the institution of any feeding operation, and the fingers thereof withdrawn from operative position and reset for future use at the conclusion of any feeding operation. Moreover, such positioning and locking mechanism, the various feeding mechanisms and the gate are so interlocked that it is impossible for the user to place a film within the gate except at such times as it is safe for him so to do, and access to the gate is necessarily unimpeded at such times as it is desirable or safe for the user to place a film therein.

It will also be understood that the method and means herein disclosed whereby the film is automatically brought within full and definite operative relation with the film handling mechanism prior to the actuation of the normal feeding operation is particularly useful in connection with means for controlling the operation of a related apparatus, such as that, for example, disclosed in the co-pending application of Earle L. Parmelee and myself, Serial Number 105,159, filed April 28, 1926, assigned to the same assignee as is the present application.

Certain of the advantages of my invention are evident from the foregoing portions of this specification.

Other advantages of my invention arise from the provision of film handling apparatus which can be automatically threaded and operated and controlled in the manner desired.

Further advantages arise from the provision of apparatus in which the various operations necessary or convenient in film feeding are carried out in an improved sequence.

Further advantages arise from the provision of mechanism which lessens the likelihood of damage to films handled thereby.

I claim:

1. In a film handling apparatus, a continuously operating driving mechanism, a member for intermittently feeding a film through said apparatus, a member for taking up the film so fed, a first means for operatively connecting and disconnecting said intermittent feeding member and said driving mechanism, a second and separate means for operatively connecting and disconnecting said taking up member and said driving mechanism, and sequential control mechanism, said sequential control mechanism including two control stations, an actuating member movable between said control stations, and devices connecting said actuating member and said intermittent member for first operating said first connecting means upon the first portion of the movement of said actuating member from one of said control stations to the other and for thereafter operating said second connecting means upon a succeeding portion of such movement whereby said intermittent member is operated before said taking up member.

2. In a film handling apparatus, a gate means to subject a film to tension within the gate, means to feed the film through said gate, and sequential control means interlocking both of said means, said control means having a single movable actuating member, the movement of which first initiates the operation of said feeding means and a predetermined interval thereafter initiates the operation of said tension means.

3. In a film handling apparatus, a gate, means to subject a film to tension within said gate, means for feeding a film through said gate, powered means for driving said feeding means, means for rendering said powered means effective to drive said feeding means, and sequential control mechanism, said control mechanism including two control stations, an actuating member movable between said stations, and connection between said actuating member and said means to subject the film to tension within said gate and said means for rendering said powered means effective to drive said feeding means for first operating said means for rendering said powered means effective to drive said feeding means and thereafter for operating said means for subjecting the film to tension within said gate.

4. In a film handling apparatus, two film supporting spindles between which a film extends, an openable gate through which the film passes disposed between said spindles, an operable member engaging the film for feeding it from one of said spindles toward the other through said gate, continuously operable means for driving said feeding member, means to close said gate, means to start the operation of said driving means, and sequential control mechanism interconnecting said gate-closing means and said starting means, said sequential mechanism including devices which first operate said starting means whereby said driving means is rendered operative upon said member to feed the film and thereafter operate said gate-closing means whereby the gate is closed upon the film.

5. In a film handling apparatus, an openable gate, means for closing and opening said gate, a film-engaging member for feeding the film, means for rendering said film-engaging member operable upon the film for feeding it through said gate, and sequential control mechanism, said sequential control mechanism including a neutral position, an operating position, an actuating member movable between said neutral position and said operating position, and connections between said actuating member and said gate-closing means and said means for rendering said film-engaging member operable upon the film for operating said means for rendering said film-engaging member operable upon the film upon the first portion of the movement of said actuating member from said neutral position to said operating position and for operating said gate-closing means upon the succeeding portion of such movement of said actuating member whereby said film-engaging member is first operated to feed the film through said gate and thereafter said gate is closed.

6. In a film handling apparatus, carriers for a film, means to feed a film from one of said carriers to another, means to subject a portion of the film intermediate said carriers to tension, and sequential control mechanism interlocking both of said means, said sequential control means including a movable control member and connections between said control member and said feeding means and said tension means for first starting the operation of said feeding means upon a first portion of the movement of said control member and for rendering said tension means operative at a predetermined interval thereafter.

7. In film handling apparatus, an openable gate, means to close said gate, means to feed a film through said gate, means to take up the film so fed through said gate, and sequential control mechanism interlocking all of said means, said control mechanism including a movable control member and connections between said control member and all of said means for first starting the operation of said feeding means upon a first portion of the movement of said control member, second starting the operation of said means to close said gate upon a succeeding portion of the movement of said control member, third stopping the operation of said feeding means upon a later succeeding portion of the movement of said control member, and fourth starting the operation of said feeding means and said taking up means upon a final movement of said control member.

8. In a film handling apparatus, a gate consisting of a plurality of sections, at least one of which is movable relatively to another, between which a film passes, mechanism adapted to feed the film therebetween, means to bring said movable section into relatively close relation to said other section to bring the film into the range of operation of said feeding mechanism, means to hold said movable section in such relatively close relation, means to actuate said feeding mechanism, means to bring said movable section into relatively closer relation to said other section to subject the film to pressure from both of said sections, and a single sequential control means interlocking all of said means for controlling the same, said control means including devices necessarily operating all of said means in the sequence herein set forth.

9. In a film handling apparatus, a gate consisting of a plurality of sections, at least one of which is movable relatively to another, between which a film passes, mechanism adapted to feed the film therebetween, means moving said movable section into relatively close relation to said other section to bring the film into the range of operation of said feeding mechanism, means to actuate said feeding mechanism, means to bring said movable section into relatively closer relation to said other section to subject the film to pressure from both of said sections, and sequential control mechanism interlocking all of said means and initiating the operation of all of said means in the sequence in which they are herein set forth.

10. In a film handling apparatus, film feeding mechanism, means for positioning a film within the range of operation of said mechanism, said film being free to move relatively to said mechanism, means for operatively connecting said mechanism with a source of power whereby said mechanism is driven by said power, means for positioning the film in full operative contact with said mechanism, and sequential control mechanism interlocking all of said means, said control mechanism including devices for initiating the operation of each of said means in the sequence in which they are herein set forth.

11. In a film handling apparatus, film feeding mechanism, means for moving a film within the range of operation of said mechanism, said film being left free to move relatively to said mechanism, means for operatively connecting said mechanism with a source of power, means for disconnecting said mechanism from said source of power, means for placing the film in full operative contact with said mechanism, and sequential control mechanism interlocking all of said means, said control mechanism including devices initiating the operation of each of said means in the sequence in which it is herein set forth.

12. In a film handling apparatus, a gate consisting of a plurality of sections, at least one of which is movable relatively to another, between which a film is fed, mechanism adapted to feed the film therebetween, means to bring said movable section into relatively close relation to said other section to bring the film into the range of operation of said feeding mechanism, connection between said feeding mechanism and a source of power, means to bring said movable section into relatively closer relation to said other section to subject the film to pressure from both of said sections, and operating mechanism interlocking both of said means and said connection and causing a period of dwell between the initiation of the operation of said first mentioned means and that of said second mentioned means and the inoperativeness of said connection during the operation of both of said means.

13. In a film handling apparatus, a gate including two movable sections between which a film is fed, mechanism to feed the film therebetween means to move one of said sections toward the other to bring the film within the range of operation of said feeding mechanism, means to actuate said feeding mechanism, means to move said first mentioned section into relatively closer relation to said second mentioned section to subject the film to pressure between said sections, means to stop the operation of said feeding mechanism, means to move said first mentioned section away from said second mentioned section whereby pressure is removed from the film, and means to move said second mentioned section to remove the film bodily from said feeding mechanism.

14. In a film handling apparatus, a gate including two movable sections between which a film passes, mechanism to feed the film therebetween, means to move one of said sections toward the other to bring the film within the range of operation of said feeding mechanism, said feeding means being disposed adjacent one of said sections, means to actuate said feeding mechanism, means to stop the operation of said feeding mechanism, means to move said first mentioned section into relatively closer relation to said second mentioned section to subject the film to pressure between said sections, means to move said first mentioned section away from said second mentioned section to remove pressure from the film, means to move said second mentioned section substantially toward said first mentioned section to remove the film bodily from said feeding mechanism, and operating mechanism interlocking all of said means, and causing the initiation of the operation of each of said means in the sequence in which it is herein set forth.

15. In a film handling apparatus, a gate including two movable sections between which a film passes, mechanism to feed the film therebetween, means to move one of said sections toward the other to bring the film within the range of operation of said feeding mechanism, means to actuate said feeding mechanism, said feeding mechanism being disposed adjacent one of said sections, means to stop the operation of said feeding mechanism, means to move said first mentioned section into relatively closer relation to said second mentioned section to subject the film to pressure between said sections, means to actuate said feeding mechanism, means to stop the operation of said feeding mechanism, means to move said first mentioned section away from said second mentioned section to remove pressure from the film, means to move said second mentioned section substantially toward said first mentioned section to remove the film bodily from said feeding mechanism, and control means interlocking all of said previously mentioned means and initiating the operation of each of said means in the sequence in which it is herein set forth.

16. In a film handling apparatus, a gate consisting of a plurality of sections, at least one of which is movable relatively to another, between which a film passes, mechanism adapted to feed the film therebetween, means to bring said movable section into relatively close relation to said other section to bring the film into the range of operation of said feeding mechanism, means to actuate said feeding mechanism, means to stop the operations of said feeding mechanism, means to bring said movable section into relatively closer relation to said other section to subject the film to pressure from both of said sections, and control mechanism interlocking all of said means and initiating the actuation of all of said means in the sequence in which they are herein set forth.

17. In a film handling apparatus, a gate consisting of a plurality of sections, at least one of which is movable relatively to another, between which a film passes, mechanism adapted to feed the film therebetween, means to bring said movable section into relatively close relation to said other section to bring the film into the range of operation of said feeding mechanism, means to actuate said feeding mechanism, means to stop the operation of said feeding mechanism, means to bring said movable section into relatively closer relation to said other section to subject the film to pressure from both of said sections, and a single control interlocking all of said means and initiating the operation of all of said means in a certain sequence.

18. In a film handling apparatus, a gate including two movable sections between which a film passes, mechanism to feed the film therebetween, means to move one of said sections toward the other whereby the film is brought within the range of operation of said feeding mechanism, said feeding mechanism being disposed adjacent one of said sections, means to actuate said feeding mechanism, means to move said first mentioned section into relatively closer relation to said second mentioned section whereby the film is subjected to pressure between said sections, means to stop the operation of said feeding mechanism, mechanism to move said first mentioned section away from said second mentioned section to remove pressure from the film, means to move said second mentioned section substantially toward said first mentioned section to remove the film bodily from said feeding mechanism, and sequential operating mechanism interlocking all of said means and initiating the operation of each of said means in the sequence in which it is herein set forth.

19. In a film handling apparatus, a gate including two movable sections between which a film passes, mechanism to feed the film therebetween, means to move one of said sections toward said feeding mechanism to bring the film within the range of operation of said feeding mechanism, means to actuate said feeding mechanism, means to move said first mentioned section into relatively closer relation to said feeding mechanism and an adjacently disposed second section to subject the film to pressure between said sections, means to actuate said feeding mechanism, means to stop the operation of said feeding mechanism, means to move said first mentioned section away from said second mentioned section to remove pressure from the film, means to move said second mentioned section away from said feeding mechanism to remove the film bodily from said feeding mechanism, control mechanism interlocking all of said means, and a single member for actuating said control mechanism.

20. In a film handling apparatus, film feeding mechanism, means for positioning a film within the range of operation of said mechanism, said film being free to move relatively to said mechanism, means for operatively connecting said mechanism with a source of power, means for disconnecting said mechanism from said source of power, means for positioning the film in full operative contact with said mechanism, means for again connecting said mechanism with a source of power, and sequential control mechanism interlocking all of said means, said control mechanism including devices for initiating the operation of each of said means in the sequence in which it is herein set forth.

21. In a film handling apparatus, a gate consisting of a plurality of sections, at least one of which is movable relatively to another, between which a film passes, mechanism adapted to feed the film therebetween, means for moving said movable section into relatively close relation to said other section and thereby bringing the film into the range of operation of said feeding mechanism, the relation of said gate sections permitting free movement of the film between said sections after such movement of said movable section, and means for moving said movable section into relatively closer relation to said other section for subjecting the film to pressure from both of said sections, and operating mechanism interlocking both of said means, and including devices providing a period of dwell between the initiation of the operations of said two previously stated means.

22. In a film handling apparatus, an openable gate and operating means for opening and closing said gate, said gate including a relatively fixed section and a section movable relatively thereto; and said operating means comprising a movable actuating member and connections between said actuating member and said relatively movable section; and said connections including motion transmitting devices and a lost motion device positioned between two of said motion-transmitting devices whereby a first portion of the movement of said actuating member is transmitted to said relatively movable gate section for moving said section, a succeeding portion of said movement is ineffective for transmission whereby said relatively movable gate section is maintained motionless, and the next succeeding portion of such movement is so transmitted whereby said relatively movable gate section is again moved.

23. In a film handling apparatus, an openable gate and operating means for opening and closing said gate, said gate including a relatively fixed section and a section movable relatively thereto and said operating means including a movable actuating member, means connecting said actuating member and said relatively movable gate section for transmitting a selected portion only of the movement of said actuating member to said gate as said gate is being opened or closed, and means for holding said movable section motionless during another portion of the movement of said actuating member.

24. In a film handling apparatus, a support, a first gate section extending from one side of said support at approximately a right angle thereto and intersecting an optical axis of the apparatus, mounting for said first section being movable in a direction along such optical axis, a second mounting extending from the same side of said support parallel to said first mentioned section, a second gate section pivotally disposed upon said second mounting for movement in a direction angular to such optical axis, a spring for holding said second gate section in parallel relation to said first gate section, and operating mechanism interlocking said sections and moving said first section toward said second section and into cooperative relation therewith to define a path through which a film may be fed or for moving said first section away from said second section and for moving said second section upon said pivotal mounting against the power of said spring to traverse such path.

25. In a film handling apparatus, a gate, said gate intersecting an optical axis of the apparatus and including two sections movable relatively to each other, a spring for holding one of said sections in parallel relation to the other to define a path therebetween through which a film may be fed, and operating mechanism interlocking said sections and moving one of said sections a predetermined distance away from said other section in a direction parallel to said optical axis and for moving said other mentioned section toward said first mentioned section against the power of said spring in a direction angular to such optical axis a distance less than such predetermined distance whereby said gate is opened and such path is traversed by said second mentioned section.

26. In a film handling apparatus, a gate, said gate including a fixed support intersecting an optical axis of the apparatus, a section mounted upon said support for movement relative thereto, a spring for holding said first section in adjacent relation to said support, a second section mounted for movement relative to said support, and operating mechanism interlocking both of said sections and moving said second section to a position wherein said second section is disposed in cooperative relation to said first section and a path therebetween defined through which a film may be fed, or for moving said second section to another position wherein said second position is disposed in distant relation to said first section and said gate is opened, or for moving said first section against the power of said spring to a position intermediate said support and said last above mentioned position of said second section for the purpose of defining an auxiliary film path.

27. In a film handling apparatus, a supporting frame, a first gate section disposed upon one side of said frame at approximately a right angle thereto and intersecting an optical axis of the apparatus, mounting for said first section being movable in a direction along such optical axis, a second mounting extending from the same side of said frame parallel to said first mentioned section, a second gate section pivotally mounted upon said section mounting for movement in a direction angular to such optical axis to a pre-determined position, a spring normally maintaining said second gate section in parallel relation to said first gate section, a guiding member disposed at substantially a right angle to said second mounting upon the side thereof remote from said frame and extending therefrom to a point adjacent such pre-determined position to prevent the insertion of a film between said second mounting and said second section when said second section is situate in such pre-determined position, and operating mechanism attached to both sections for moving said sections upon said mountings.

28. In a film handling apparatus, a gate adapted normally to define a path through which a film may be fed, said gate including a plurality of sections, one of said sections being so arranged that it can be disposed in a predetermined position wherein it defines one side of such path, a toothed member, extending through an opening in said section when said section is disposed in such position and into such path for feeding a film therethrough, said section having such an opening, a spring normally holding said section in such position, means for moving said section out of such position and across such path whereby said section removes the film from the teeth of said member, means for moving said toothed member in a feeding direction while it projects through said opening thereby advancing the film, means for retracting said toothed member from said opening and moving it while retracted to its original feeding position in preparation for another feeding movement, and means for maintaining said gate section motionless during such reverse movement of said feeding member.

29. In a film handling apparatus, a gate adapted normally to define a path through which a film may be fed, said gate including a plurality of sections, one of said sections being so arranged that it can be disposed in a predetermined position wherein it defines one side of such path, a toothed member, extending through an opening in said section when said section is disposed in such position for feeding a film therethrough, said section having such an opening, a spring normally holding said section in such position, means for moving said section out of such position and across such path to a second position, beyond the range of operation of said member, whereby said section protects the film from the teeth of said member, means for moving said toothed member in a feeding direction while it projects through said opening thereby advancing the film, means for retracting said toothed member from said opening and moving it while retracted to its original feeding position in preparation for another feeding movement, and means for maintaining said gate section motionless during such reverse movement of said feeding member.

30. In a film handling apparatus, a gate adapted normally to define a path through which a film may be fed, said gate including a plurality of sections, one of said sections being so arranged that it can be disposed in a predetermined position wherein it defines one side of such path, a toothed member, extending through an opening in said section when said section is disposed in such position and into such path for feeding a film therethrough, said section having such an opening, a spring normally holding said section in such position, means for moving said section out of such position and across such path to a second position, beyond the range of operation of said member, whereby said section protects the film from the teeth of said member, and means for locking said section, against the action of said spring, in said second position, means for moving said toothed member in a feeding direction while it projects through said opening thereby advancing the film, means for retracting said toothed member from said opening and moving it while retracted to its original feeding position in preparation for another feeding movement, and means for maintaining said gate section motionless during such reverse movement of said feeding member.

31. In a film handling apparatus, a gate comprising a plurality of sections two of which are movable relatively to each other, a toothed member for feeding a film between said sections, a first of said movable sections and said member being so arranged that said section is movable to a position wherein said member extends through an opening in said section, said section having such an opening, a spring for holding said section in such position, and operating means interlocking said sections and having a control member operable to initiate the movement of the second of said sections into cooperative relation with said first section while said first section is maintained in such position to define a path therebetween through which the film may be fed and said member extends within said path, or for moving said second section away from said first section to dispose said sections in relatively distant relation whereby a film may be inserted into or removed from the space therebetween and the teeth of said member are accessible, or for moving said first section toward said second section against the action of said spring across such path and disposing said section between the area of operation of said toothed member and said second section whereby it protects the film from the teeth of said feeding member.

32. In a film handling apparatus, a gate comprising a plurality of sections two of which are movable relatively to each other, a toothed member for feeding a film between said sections, a first of said movable sections and said member being so arranged that said section is movable to a position wherein said member extends through an opening in said section, said section having such an opening, a spring for holding said section in such position, operating means interlocking said sections and having a control member operable to initiate the movement of the second of said sections into cooperative relation with said first section while said first section is maintained in such position to define a path therebetween through which the film may be fed and said member extends within said path, or for moving said second section away from said first section to dispose said sections in relatively distant relation whereby a film may be inserted into or removed from the space therebetween and the teeth of said member are accessible, or for moving said first section toward said second section against the action of said spring across such path and disposing said section between the area of operation of said toothed member and said second section whereby it protects the film from the teeth of said feeding member, and means for locking said operating means to maintain said sections in any of such herein defined relations.

33. In a film handling apparatus, a supporting frame, a gate, said gate comprising a plurality of sections extending at substantially right angles from one side of said frame, one of which sections is movable relatively to another, and mechanism for moving said movable section from a position relatively distant from said other section into cooperative relation therewith, said mechanism comprising a member attached to said movable section, a rotatable shaft disposed at substantially a right angle to said member and extending from the same side of said frame as that from which said sections extend, a link attached to said shaft adjacent said frame at substantially a right angle thereto, a pin and slot connection between said link and said member, a second connective pin, and means for rotating said shaft, said pin and slot and said second connective pin, upon the initial portion of the movement of said shaft, causing said pin to operate against a side of said slot for moving said member, the succeeding portion of such movement operates said pin longitudinally within said slot and brings said second connective pin and said link into operative relation, and the final portion of such movement operates said member through said second pin and said link.

34. In a film handling apparatus which includes means for feeding a film therethrough, an openable sectional gate and means for operating said gate, said gate including a relatively fixed section and a relatively movable section, said movable section being disposable in a distant position relatively to said fixed section so that a film may be initially introduced between said sections, in a cooperative position relatively adjacent said fixed section whereby the film is pressed into close relation to said fixed section for the film feeding operation, and in an intermediate position between said distant and cooperative positions, said intermediate position being useful in connection with the preliminary manipulation of the film, and said operating means including an actuating member, a first operating station, a second operating station, said actuating member being movable between said first and second stations, and devices connecting said actuating member and said movable section for moving said movable section from said distant to said intermediate position upon the first portion of the movement of said actuating member from said first operating station toward said second operating station, maintaining said movable section in said intermediate position during the next portion of such movement, and moving said movable section from said intermediate position to said cooperative position during the final portion of such movement of said actuating member to said second operating station.

35. In a film handling apparatus, a gate, said gate comprising a plurality of sections one of which is movable relatively to another, and means for moving said movable section from a position relatively distant from said other section into cooperative relation therewith, said means comprising an operating member attached to said movable section, a movable actuating member, and connective mechanism therebetween, said connective mechanism comprising a first driving element, a second driving element, and a driven element associated with said driving elements, said driving elements being operatively connected with said member whereby the initial position of the movement of said actuating member causes operation of said driven elements by the engagement of said first driving element therewith, said moving means including devices effective upon the succeeding portion of such movement of said actuating member to hold said first driving element and said driven element in locking relation with each other and to bring said second driving element into operative engagement with said driven element, and driving the final portion of such movement to cause operation of said driven element by the engagement of said second driving element therewith.

36. In a film handling apparatus, a gate, said gate comprising a plurality of sections one of which is movable relatively to another, and means for moving said movable section from a position relatively distant from said other section into cooperative relation therewith, said means comprising an operating member attached to said movable section, a movable actuating member, and connective mechanism therebetween, said connective mechanism comprising a first driving element, a second driving element, and a driven element associated with said driving elements, said driving elements being operatively connected to said member whereby the initial portion of the movement of said actuating member causes operation of said driven element by the engagement of said first driving element therewith, the succeeding portion of such movement of said actuating member bringing said second driving element into operative engagement with said driven element, and the final portion of such movement causes operation of said driven element by the engagement of said second driving element therewith.

37. In a film handling apparatus, a supporting frame, a gate, said gate comprising a plurality of sections extending at substantially right angles from one side of said frame, one of which sections is movable relatively to another, and mechanism for moving said movable section from a position relatively distant from said other section into cooperative relation therewith, said mechanism comprising a member attached to said movable section, a rotatable shaft disposed at substantially right angles to said member, a rotatable operating element, and a connection between said shaft and said element whereby the rotation of said element longitudinally moves said member, and means for rotating said element, said connection including devices effective upon the initial portion of such rotational movement of said element to move said section a predetermined portion of the distance toward said other section, and upon the succeeding portion of such movement to hold said movable section locked, and upon the final portion of such movement to move said section into completely operative relation to said other section.

38. In an apparatus for handling a perforated film, film feeding mechanism, means for moving a film laterally to a position wherein it is within the range of operation of said mechanism, said film being free to move relative to said mechanism so that said mechanism is able to grope for the perforations of said film, means for connecting said mechanism with a source of power, means for disconnecting said mechanism from said source of power, means for placing the film in full operative contact with said mechanism, control mechanism interlocking all of said means, and a single member for actuating said mechanism.

39. In a film feeding apparatus, control mechanism movable from and to a re-winding position, a film gate, means movable to a position wherein it locks the film against lateral movement out of the film gate, and a connection between said control mechanism and said locking means for moving said locking means to such locking position upon the movement of said control mechanism to said rewinding position.

40. In a film handling mechanism, means for continuously moving a film through a gate, means for laterally moving a film into a predetermined position within said gate, and control mechanism interlocking both of said means and operating first to actuate said lateral moving means and then to actuate said film moving means.

41. In a film handling apparatus, a gate through which a film passes, means to feed the film through said gate in one direction, means to feed the film through said gate in the other direction, means to move the film into a predetermined position within said gate, and control mechanism interlocking all of said means and operating to actuate said moving means prior to the actuation of either of said feeding means and to withdraw said moving means from operative position after the conclusion of the operation of either of said feeding means.

42. In a film handling apparatus, a gate through which a film passes, means to move a film therethrough in one direction, means to move the film therethrough in the opposite direction, means to move the film into correct lateral position relative to said gate, and mechanism interlocking all of said means and operating to actuate said lateral positioning means prior to the actuation of either of said film moving means.

43. In a film handling apparatus, film carriers, means to move a film between one of said carriers and another, means to move the film between said second mentioned carrier and said first mentioned carrier in the contrary direction, means to move the film within the path of travel for the film between said carriers from a position without such path, and sequential control means interlocking all of said means for rendering said positioning means operative before either of said moving means can be rendered operative and for moving said positioning means to inoperative position at the conclusion of the operation of either of said film moving means.

44. In a film handling apparatus, means for rewinding a film through an open gate, means for locking the film against lateral movement relative to said gate during such rewinding operation, and a single means for stopping such rewinding operation and for withdrawing said locking means from such locking relation to the film.

45. In a film handling apparatus, a take-up spindle, a rewinding spindle, a gate disposed therebetween, means to move the film laterally to a position within said gate and to lock it therein, means to rewind the film through said gate from said take-up to said rewinding spindle, and a single control means interlocking all of said means and operating first to actuate said positioning and locking means, second to actuate said rewinding means while maintaining said locking and positioning means in operative position, and third to move said positioning and locking means to inoperative position.

46. In a film handling apparatus, an openable gate through which a film passes, means to move a film therethrough while said gate is open, means movable relatively to an edge of the film to a position wherein it is necessarily effective to lock the film against lateral movement relative to said gate during such movement, and control mechanism interlocking said means.

47. In a film handling apparatus, means for continuously moving a film through a gate, means movable to a position wherein it moves the film laterally to a position within said gate prior to said moving operation, and a single control means effective concurrently to stop the operation of said moving means and to withdraw said positioning means from such operative position to which it has been moved.

48. In a film handling apparatus, a first means for moving a film, a motor, a first clutch for operatively connecting said motor and said first film moving means, a second means for moving the same film as is fed by said first moving means and in the same direction, a second clutch for operatively connecting said second film moving means and said motor, a first operable control means for rendering said first clutch operative and inoperative, a second operable control means for rendering said second clutch operative and inoperative, a movable actuating member, two operating stations between which said actuating member is movable, said two control means each including an element which is disposed at a different point along the path of said actuating member between said operating stations and engageable therewith whereby the movement of said actuating member between said stations successively operates each of said control members whereby said first and second film moving means are sequentially placed in driven relation to said motor, and means for moving said actuating member between said operating stations.

49. In a film handling apparatus, a member for moving a film, a motor, means for operatively connecting and disconnecting said motor and said film moving member, an operable control member for rendering said connecting means operative and inoperative, a movable actuating member, two operating stations between which said actuating member is movable, said control member including a plurality of different elements disposed at different points along the path of said actuating member between said operating stations and engageable by said actuating member for operating said control member to render said connecting means successively operative and inoperative to place said film feeding member in driven relation to said motor, and means for moving said actuating member between said operating stations.

50. In a film handling apparatus, the combination of a film feeding mechanism and a sequential control mechanism therefor, said control mechanism including a film threading position, a still picture position, an actuating member movable between said positions and connections between said actuating member and said film feeding mechanism for rendering said film feeding mechanism inoperative while said actuating member is situate in said film threading position, and operative during at least a portion of the movement of said actuating member from said film threading to said still picture position, and inoperative while said actuating member is situate in said still picture position.

51. In a film handling apparatus, film feeding mechanism and sequential control mechanism therefor, said control mechanism including a film threading position, a still picture position, a projection-in-motion position, an actuating member, movable between said positions, and connections between said actuating member and said film feeding mechanism rendering said film feeding mechanism necessarily operative during at least a portion of the movement of said actuating member from said film threading to said still picture position, and necessarily inoperative while said actuating member is situate in said still picture position, and necessarily operative while said actuating member is situate in said projection-in-motion position.

52. In a film handling apparatus, film feeding mechanism and sequential control mechanism therefor, said control mechanism including a film threading position a projection-in-motion position, an actuating member movable between said positions, and connections between said actuating member and said film feeding mechanism rendering said feeding mechanism inoperative while said actuating member is situate in said film threading position, and necessarily operative while said actuating member is situate in said projection-in-motion position, and first necessarily operative and then necessarily inoperative during the movement of said actuating member from said projection-in-motion position to said film threading position.

53. In a film handling apparatus, film carriers, a gate, means for closing or opening said gate, means for feeding a film from one of said carriers to the other through said gate, means for feeding the film from said second mentioned carrier to said first mentioned carrier through said gate, braking means for at least one of said carriers, and control mechanism interlocking all of said means and operating to apply said braking means after either of said feeding means has been rendered inoperative and before said gate has been closed.

54. A film handling apparatus comprising carriers, means to move a film between said carriers in either of two directions, braking means for at least one of said carriers, and control means interlocking said previously mentioned means and operating to apply said braking means for a predetermined interval only intermediate each such change of direction of movement of the film and for rendering said braking means inoperative during the major portion of the movement of the film between the carriers.

55. Apparatus for feeding material comprising revoluble carriers, breaking means for at least one of said carriers, means to feed the material from one of said carriers to another, means to feed the material from said second mentioned carrier to said first mentioned carrier, and control mechanism interlocking all of said means, said control mechanism including devices for actuating each of said feeding means and for applying said braking means for a short predetermined period only intermediate each such actuation of said feeding means.

56. In a film handling apparatus, two revoluble carriers, means for operating one of said carriers whereby a film supported by the other is wound thereupon, means for operating said other carrier whereby the film wound upon said first mentioned carrier is rewound therefrom upon said second mentioned carrier, said operating means being alternately operable, braking means for both of said carriers, and control means interlocking all of said means and including devices for simultaneously applying said braking means to both of said carriers for a short predetermined period only intermediate the application of said operating means.

57. Apparatus for the feeding of material, comprising a plurality of revoluble carriers, means for operating a first of said carriers at a relatively low speed whereby the material supported upon a second of said carriers is wound upon said first carrier, means for operating said second carrier at a relatively high speed whereby the material supported upon said first carrier is rewound upon said second carrier, braking means for at least one of said carriers, and control mechanism interlocking all of said means, said control means including devices for alternatively actuating each of said operating means and for first applying said braking means for a short period intermediate each such actuation of said operating means and thereafter rendering said braking means inoperative so that the subsequent winding operation is carried out without braking interference.

58. In a film handling apparatus, a light source, a shield cooperating with said light source to protect the film from the heat thereof, means normally maintaining said shield in protective position, film feeding mechanism, means for operating said mechanism from a source of power, and sequential control means interlocking all of said previously mentioned means and including devices for initiating the operation of said means for operating said feeding mechanism, then rendering said operating means ineffective, such first and second operations being for the purpose of initially positioning the film in a desired operative relation to said apparatus, and third for again actuating said feeding means and for rendering said maintaining means ineffective and withdrawing said shield from such protective position, such third operation being for the purpose of carrying out the normal feeding operation of the apparatus.

59. In a film handling apparatus, a light source, a shield cooperating with said source to shield the film from the heat thereof, film feeding mechanism, means to operate said feeding mechanism from a source of power, film taking-up mechanism, means to operate said taking-up mechanism from a source of power, and sequential control means interlocking all of said previously mentioned means and said shield and including devices for first initiating the operation of said means to operate said film feeding mechanism, second to withdraw said protective means from cooperation with the film, and third to actuate said means to operate said taking-up means.

60. In a film handling apparatus, a light source, a shield cooperating with said source to protect the film from the heat thereof, film feeding mechanism, film taking up mechanism, and sequential operating means interlocking said shield and both of said mechanisms and including devices operable for first actuating said feeding mechanism for the purpose of initially positioning the film in a pre-determined relation to the apparatus, second stopping the operation of said feeding mechanism, and third withdrawing said heat shield from protective position and operating said feeding mechanism and said taking-up mechanism for the purpose of regularly projecting the film.

WARREN DUNHAM FOSTER.